United States Patent
Ui et al.

(10) Patent No.: US 11,706,537 B2
(45) Date of Patent: Jul. 18, 2023

(54) IMAGE SENSOR AND METHOD FOR READING OUT SIGNAL OF IMAGE SENSOR

(71) Applicant: OmniVision Technologies, Inc., Santa Clara, CA (US)

(72) Inventors: Hiroki Ui, Yokohama (JP); Eiichi Funatsu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/715,376

(22) Filed: Apr. 7, 2022

(65) Prior Publication Data

US 2023/0199341 A1 Jun. 22, 2023

Related U.S. Application Data

(60) Provisional application No. 63/186,900, filed on May 11, 2021.

(51) Int. Cl.

| H04N 25/704 | (2023.01) |
|---|---|
| H04N 25/77 | (2023.01) |
| H04N 25/44 | (2023.01) |
| H04N 25/78 | (2023.01) |
| H04N 25/46 | (2023.01) |

(52) U.S. Cl.
CPC .......... *H04N 25/704* (2023.01); *H04N 25/44* (2023.01); *H04N 25/77* (2023.01); *H04N 25/78* (2023.01)

(58) Field of Classification Search
CPC ...... H04N 25/704; H04N 25/78; H04N 25/44; H04N 25/77; H04N 25/46–50
See application file for complete search history.

(56) References Cited

U.S. PATENT DOCUMENTS

| 2008/0291311 | A1* | 11/2008 | Kusaka | H04N 25/77 |
| | | | | 348/308 |
| 2014/0198183 | A1* | 7/2014 | Kim | H04N 25/65 |
| | | | | 348/46 |
| 2015/0312461 | A1* | 10/2015 | Kim | H01L 27/14609 |
| 2021/0105423 | A1* | 4/2021 | Miyakoshi | H04N 25/00 |
| 2021/0337144 | A1* | 10/2021 | Wang | H04N 25/704 |
| 2021/0344868 | A1* | 11/2021 | Iwata | H04N 25/50 |
| 2022/0345651 | A1* | 10/2022 | Tachi | H04N 25/46 |

* cited by examiner

*Primary Examiner* — Marly S Camargo

(57) ABSTRACT

An image sensor includes a plurality of pixels that is arranged in a matrix and each of which outputs a signal in response to incident light, wherein readout of data can be performed with respect to the plurality of pixels, and simultaneous readout of data of a plurality of columns of pixels can be performed, and at least one pixel of the plurality of columns of pixels to be read simultaneously can be read for phase detection with respect to each of divided sub-pixels. The image sensor is configured to, with n rows as a readout unit where n is an integer of 2 or more, perform readout for at least one sub-pixel of at least one pixel in one readout cycle within the readout unit, perform readout for each pixel including phase detection readout for the other sub-pixel of the at least one pixel in which the at least one sub-pixel has been read in the one readout cycle, in another readout cycle within the readout unit, and end the readout for the readout unit with the n+1 readout cycles.

12 Claims, 40 Drawing Sheets

FIG. 15

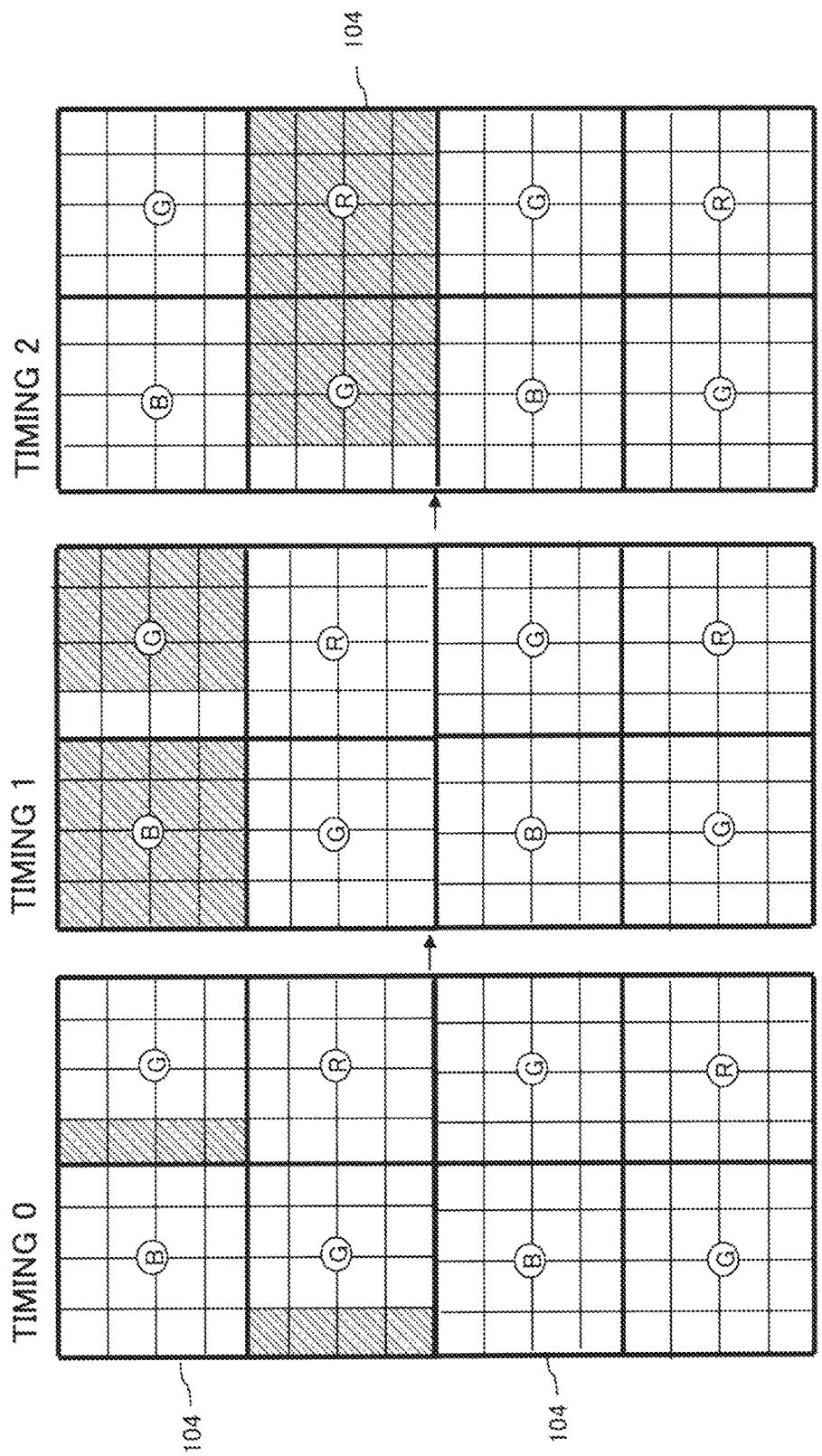

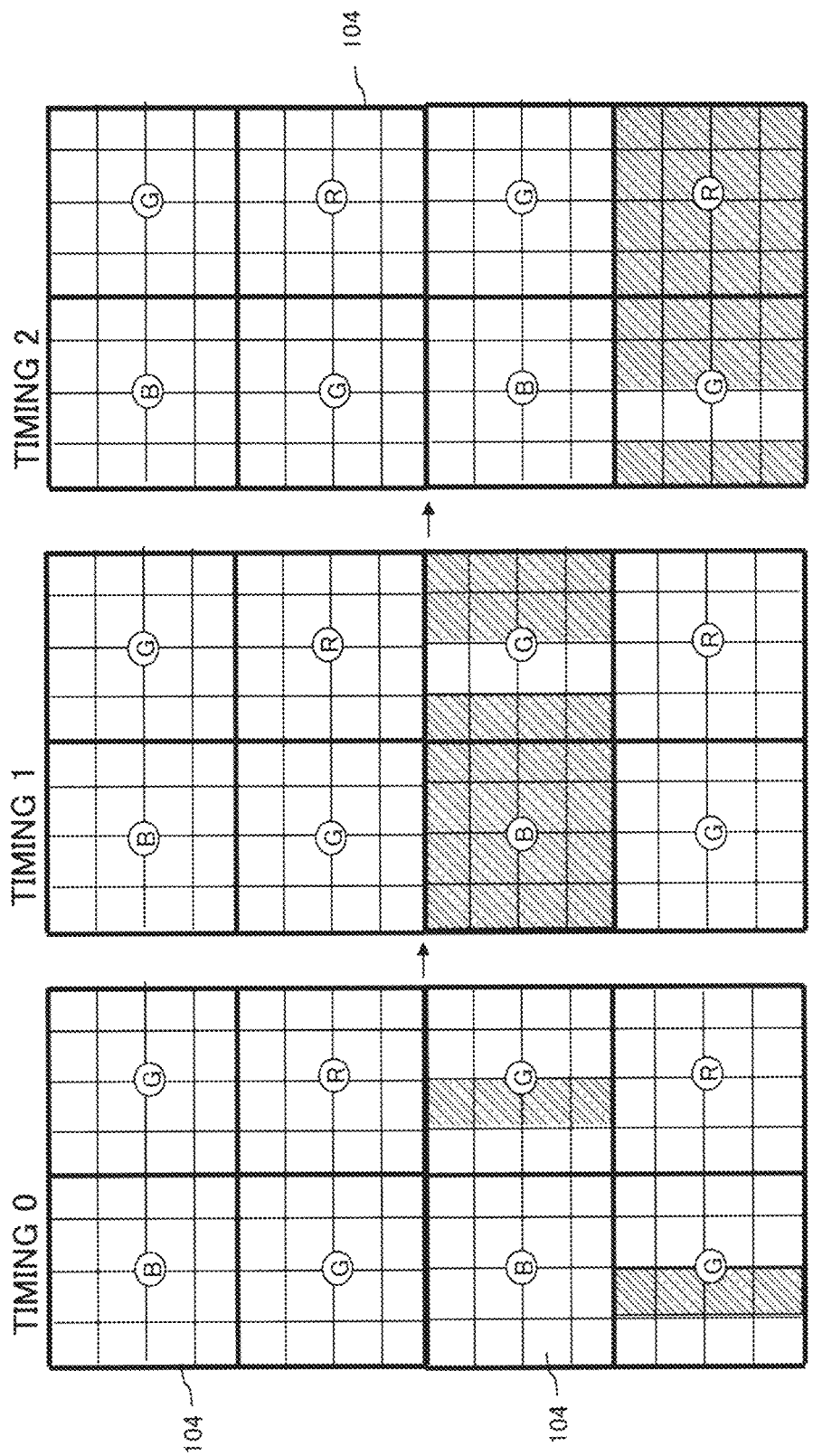

IMAGE SENSOR AND METHOD FOR READING OUT SIGNAL OF IMAGE SENSOR

CROSS REFERENCE TO RELATED APPLICATION

This application is related to and claims priority under 35 U.S.C. 119 to U.S. provisional Patent application 61/186, 900, filed May 11, 2021 which is incorporated herein by reference in its entirety.

BACKGROUND INFORMATION

Field of the Disclosure

This disclosure relates generally to image sensors, and in particular but not exclusively, relates to image sensors that include phase detection auto focus pixels.

Background

Image sensors have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an miasmal scene being incident upon the imago sensor. The image sensor includes an array of pixels having photosensitive elements (e.g., photodiodes) that absorb a portion of the incident image light and generate image charge upon absorption of the image light. The image charge of each of the pixels may be measured as an output signal from each photosensitive element that varies as a function of the incident image light. In other words, the amount of image charge generated is proportional to the intensity of the image light, which is utilized to produce a digital image (i.e., image data) representing the external scene.

Here, as an auto focusing technique in the imago sensor, there is a technique called half-shield phase detection (HSPD). In the HSPD, a plurality of phase detection pixels in which a half of one pixel is shielded are provided as phase detection pixels. Then, phase detection signals for auto focusing are acquired using a plurality of signals for half parts of the phase detection pixels which are not shielded.

An HSPD pixel cannot be used as an image signal, which results in an image defect. On the other hand, when the number of the HSPD pixels is decreased, the accuracy of the phase detection deteriorates.

In addition, there is also known a technique called dual PD mode output. In the dual PD mode output, each pixel comprises a plurality of sub-pixels, and a phase detection signal for auto focusing is acquired with respect to each pixel by reading each sub-pixel for one pixel in a plurality of cycles.

Its the dual PD mode output, a plurality of readout cycles is provided with respect to one pixel, which leads to a decrease in readout speed.

SUMMARY

This disclosure generally relates to image sensors. An image sensor includes a plurality of pixels that is arranged in a matrix and each of which outputs a signal in response to incident light, wherein readout of data can be performed with respect to the plurality of pixels, and simultaneous readout of data of a plurality of columns of pixels can be performed, and at least one pixel of the plurality of columns of pixels to be read simultaneously is read for phase detection with respect to each of divided sub-pixels, and a processor configured to control readout of the signal from each pixel. The processor is configured to, with n rows as a readout unit where n is an integer of 2 or more, perform readout for at least one sub-pixel of at least one pixel in one readout cycle within the readout unit, perform readout for each pixel including readout for the other sub-pixel of the at least one pixel in which the at least one sub-pixel has been read in the one readout cycle, in another readout cycle within the readout unit, and end the readout for the readout unit with the n+1 readout cycles.

Such an image sensor makes it possible to acquire phase detection signals for auto focusing. This also makes it possible to perform the readout with relatively small number of readout cycles. Furthermore, this makes it possible to use the data from all of the pixels as image signals.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 15 is a diagram illustrating a readout operation in the case where 32 rows and eight columns serve as a unit.

FIG. 20A is a diagram (first half) illustrating a readout operation of a modified exile of the readout operation (the readout for the First and second rows is the same as the readout illustrated in FIG. 17, the readout for the third and fourth rows is the same as the readout illustrated in FIG. 18) in the case of a configuration of 16C cells.

FIG. 20B is a diagram (second half) illustrating a readout operation of a modified example of the readout operation (the readout for the first and second rows is the same as the readout illustrated in FIG. 17, the readout for the third and fourth rows is the same as the readout illustrated in FIG. 18) in the case of a configuration of 16C cells.

Figure 1A:
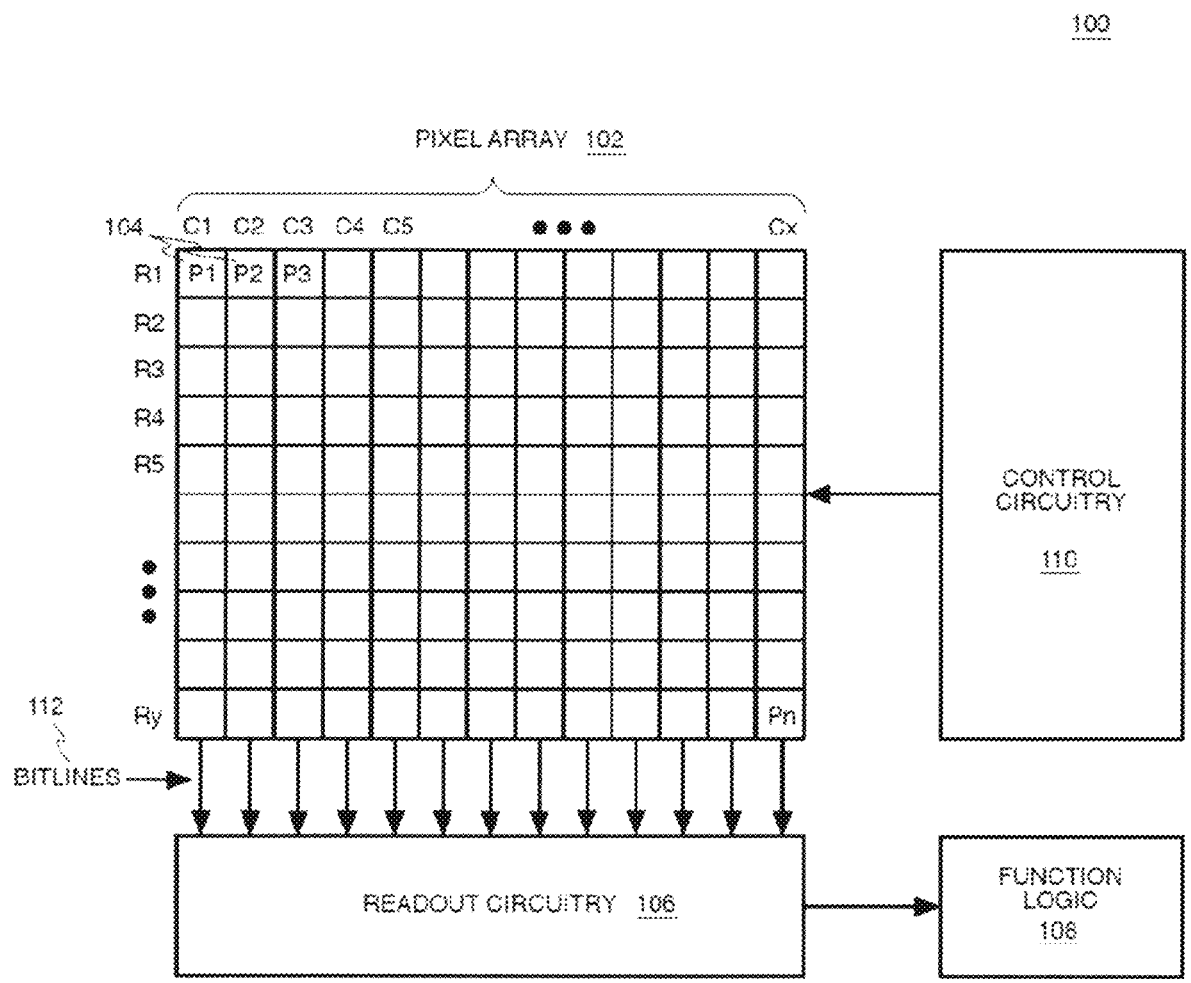
FIG. 1A illustrates one example of an imaging system including an image sensor with phase detection auto focus pixels in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of those various embodiments of the present invention.

DETAILED DESCRIPTION

Examples directed to flexible exposure control for color pixel arrays with arrays of photodiodes including phase detection autofocus photodiodes interspersed among binned imago sensing photodiodes am described herein. In the following description, numerous specific details are sett forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

The usage in this specification of relative terms, such as "beneath," "below," "lower," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above end below. The device may be otherwise oriented (rotated ninety degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically deemed herein or the context of their use would clearly suggest otherwise. It should be noted that element names and symbols may be used interchangeably through this document (e.g., Si vs. silicon); however, both have identical meaning.

As will be discussed, various examples of color pixel arrays with arrays of photodiodes including phase detection autofocus photodiodes interspersed among binned image sensing photodiodes are disclosed. In the various examples, at least some of the transfer transistors coupled to the phase detection autofocus photodiodes may be controlled separately from the image sensing photodiodes in the same row of the array of photodiodes of an image sensor, which provides flexible exposure control, high speed, and low power consumption for the image sensor in accordance with the teachings of the present invention.

To illustrate, FIG. 1A illustrates one example of an imaging system 100 including a color pixel array 102 with an array of photodiodes including phase detection autofocus photodiodes interspersed among binned image sensing photodiodes in accordance with an embodiment of the present disclosure. In particular, imaging system 100 includes pixel array 102, control circuitry 110, readout circuitry 106, and function logic 108. In one example, pixel array 102 is a two-dimensional (2D) array of photodiodes, (e.g., P1, P2, . . . , Pn), which include phase detection autofocus photodiodes interspersed among binned image sensing photodiodes. As will described in further detail below, in various examples at least some of the transfer transistors coupled to the phase detection autofocus photodiodes may be controlled separately from the image sensing photodiodes in the same row of the array of photodiodes 104. As illustrated in the depicted example, pixels 104 are arranged into rows (e.g., R1 to Ry) and columns (e.g., C1 to Cx) to acquire image data of a person, place, object, etc., which can then be used to render a 2D image of the person, place, object, etc. In the examples, the phase detection autofocus photodiodes interspersed in the pixel array 102 provide phase detection information, which can be used for autofocus operations of imaging system 100.

In one example, after each image sensor photodiode/pixel 104 in pixel awry 102 has acquired its image charge or phase detection charge through photogeneration of the charge, corresponding image data and/or phase detection charge is read out by a readout circuit through bit lines 112 and then transferred to function logic 108. Readout circuitry 106 may be coupled to read out data from the plurality of pixels 104 in pixel array 102. In various examples, the readout circuitry 106 may include amplification circuitry, analog-to-digital (ADC) conversion circuitry, or otherwise. In one example, the readout circuitry 106 may read out a row of data at a time along bit lines 112 as illustrated in FIG. 1A. The function logic 108 may store the image data or even manipulate the image data by applying post image effects (e.g., crop, rotate, remove red eye, adjust brims adjust contrast, or otherwise).

Figure 1B:
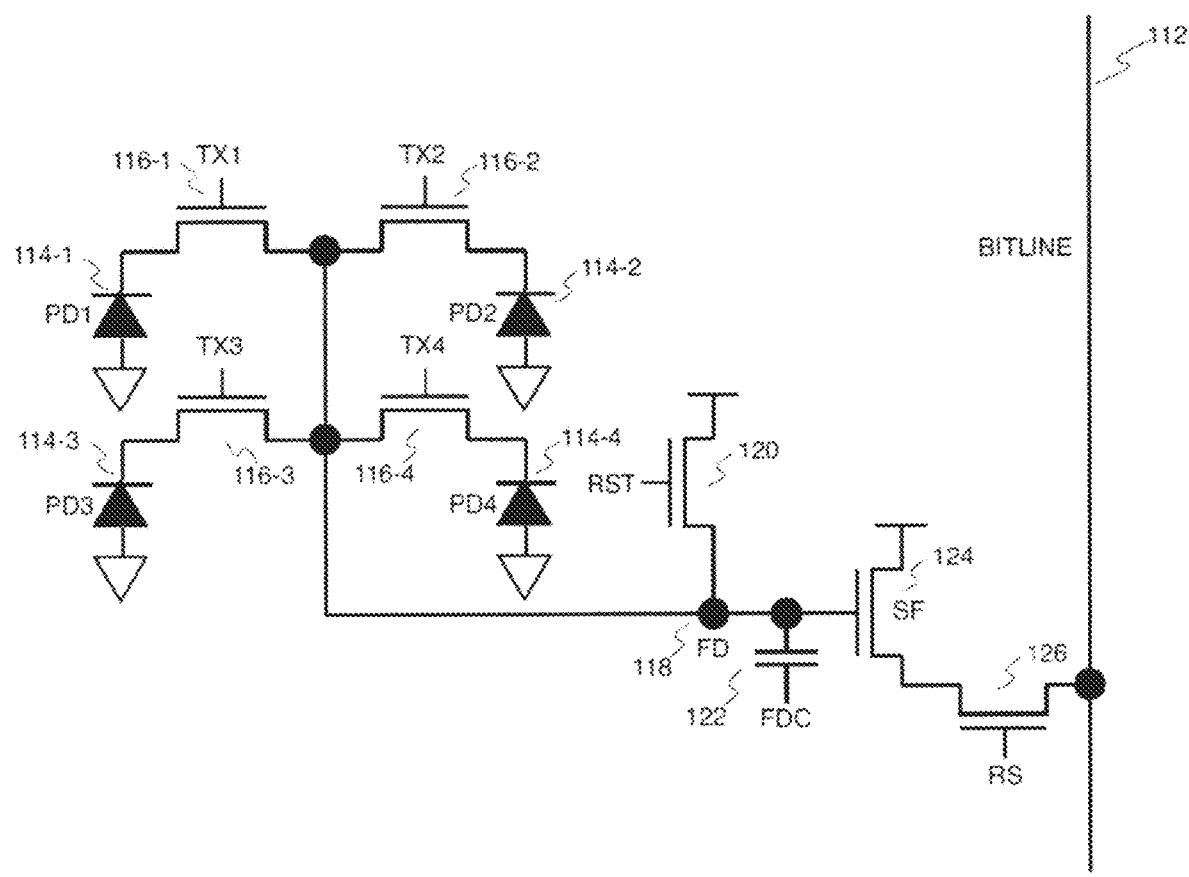
FIG. 1B illustrates one example of a pixel circuit included in an imaging system with an array of photodiodes including phase detection autofocus photodiodes interspersed among binned image sensing photodiodes in accordance with the teachings of the present invention in accordance with the teachings of the present invention.

FIG. 1B illustrates one example of a schematic of pixel circuit 104, which is included in an imaging system with an array of photodiodes including phase detection autofocus photodiodes interspersed among binned image sensing photodiodes in accordance with the teachings of the present invention. It is appreciated the pixel circuit 104 of FIG. 1B may be an example of a pixel 104 of the image sensor 100 as shown in FIG. 1A, and that similarly named and numbered elements described above are coupled and function similarly below.

In the example depicted in FIG. 1B, pixel circuit 104 includes a photodiode 114-1 coupled to a transfer transistor 116-1, a photodiode 114-2 coupled to a transfer transistor 116-2, a photodiode 114-3 coupled to a transfer transistor 116-3, and a photodiode 114-4 coupled to a transfer transistor 116-4. A floating diffusion 118 is coupled to transfer transistor 116-1, transfer transistor 116-2, transfer transistor 116-3, and transfer transistor 116-4. In various examples, an optional floating diffusion capacitance control signal FDC may also be included and is to be coupled to a capacitor 122, which is coupled to the floating diffusion 118. In one example the floating diffusion capacitance control signal FDC may be utilized to provide a boost control signal to the capacitors 122 coupled to the floating diffusions 118 as shown.

Transfer transistor 116-1 is coupled to be controlled in response to a transfer control signal TX1, transfer transistor 116-2 is coupled to be controlled in response to a transfer control signal TX2, transfer transistor 116-3 is coupled to be controlled in response to a transfer control signal TX3, and transfer transistor 116-4 is coupled to be controlled in response to a transfer control signal TX4. As such, charge photogenerated in photodiode 114-1 in response to incident light is transferred to floating diffusion 118 in response to transfer control signal TX1, charge photogenerated in photodiode 114-2 in response to incident light is transferred to floating diffusion 118 in response to transfer control signal TX2, charge photogenerated in photodiode 114-3 in response to incident light is transferred to floating diffusion 118 in response to transfer control signal TX3, and charge photogenerated in photodiode 114-4 in response to incident light is transferred to floating diffusion 118 in response to transfer control signal TX4.

As illustrated in the depicted example, a reset transistor 120 is coupled between a voltage supply (e.g., AVDD) and the floating diffusion 118. A gate of a source follower translator 124 is coupled to the floating diffusion 118. The drain of the source follower transistor 124 is coupled to a voltage supply (e.g., AVDD). A row select transistor 126 is coupled to a source of the source follower transistor 124. In operation, the row select transistor 126 is coupled to output a data signal (e.g., image data or focus data) from the source follower transistor 124 of pixel circuit 104 to a bit line 112 in response to a row select signal RS.

In various examples, some or all of the photodiodes 114-1, 114-2, 114-3, and 114-4 may be configured as image sensing photodiodes included in a color pixel array, and some or all of the photodiode 114-1, 114-2, 114-3, and 114-4 may be configured as phase detection autofocus photodiodes depending on the specific location of the pixel circuit 104 within the pixel array.

In such an example, the incident light that is directed to the photodiodes 114-1, 114-2, 114-3, and 114-4 that are configured as image sensing photodiodes is directed through respective color filters of a color filter array before reaching the photodiodes 114-1, 114-2, 114-3, and 114-4. In one example, the color filter array may be a Bayer color filter. Thus, the incident light may be directed through a red color filter, or a green color filter, or a blue color filter before reaching the photodiodes 114-1, 114-2, 114-3, and 114-4 that are configured as image sensing photodiodes.

In various examples, the incident light that is directed to the photodiodes 114-1, 114-2, 114-3, and 114-4 that are configured as phase detection autofocus photodiodes is directed through a microlens prior reaching the respective photodiodes 114-1, 114-2, 114-3, and 114-4. In the various examples, other than the incident light being directed through either a color filter or through a microlens, the photodiodes 114-1, 114-2, 114-3, and 114-4 are otherwise substantially similar.

n various examples, the photodiodes of the pixel army are binned, including photodiodes 114-1, 114-2, 114-3, and 114-4. As such, the information generated from each photodiode is summed with information generated from one or more nearby binned photodiodes to generate combined information, and therefore sum the performance of each individual photodiode to improve the performance of the pixel array. For instance, in various examples, 2×2 groupings of photodiodes (i.e., 4C calls) are configured to be binned such that the 4 photodiodes included in each grouping all share the same color. In other words, the photodiodes are arranged in the pixel array such that each 2×2 grouping of image sensing photodiodes is either red, green, or blue. In one example, the 2×2 groupings of binned photodiodes are all adjacent photodiodes in the pixel array and share the same color filter. In one example, the 2×2 groupings of binned photodiodes may all shore the same color, but each two photodiodes that have the same color are separated from one antler by another photodiode having a different color.

In various examples, phase detection autofocus photodiodes are grouped in 2×2 groupings, which are interspersed among image sensing photodiodes, share a microlens. In another example, phase detection autofocus photodiodes are grouped in 2×1 groupings that share a microlens and are interspersed among image sensing photodiodes of a odor pixel array.

Figure 2:
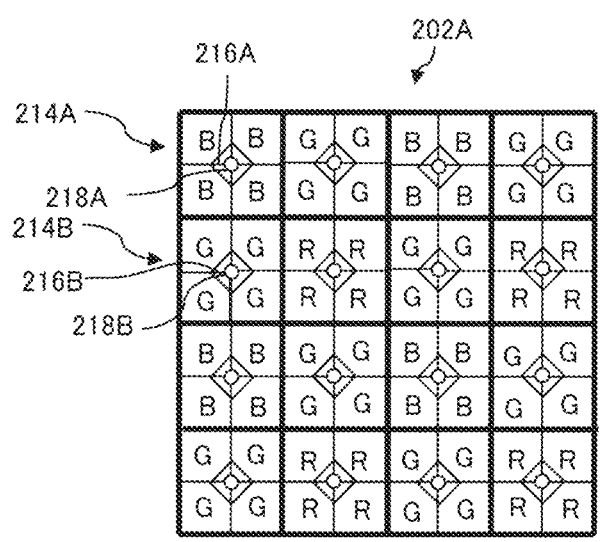
FIG. 2 illustrates one example of a color pixel array with groupings of photodiodes of the same color fluttery) accessed with one floating diffusion.

FIG. 2 illustrates an example of a color pixel array 202A including a color filter array disposed over groupings of photodiodes 214A, 214B. In the example, each grouping of photodiodes 214A, 214B includes four neighboring photodiodes surrounding four respective transfer transistors 216A, 216B, which surround respective floating diffusions 218A, 218B.

Thus, as shown in the depicted example, each single floating diffusion 218A, 218B is shared among the four respective photodiodes included in each respective grouping of photodiodes 214A, 214B through respective transfer transistors 216A, 216B. In the example, the color filter array has a Bayer color filter array pattern. In the depicted example, red color filters are indicated with an "R" label, green color filters are indicated with a "G" label, and blue color filters are indicated with a "B" label. As shown in the example depicted in FIG. 2, all four photodiodes of each grouping of photodiodes 214A, 214B are under the same color filter of the color filter array.

In various configurations, a 4C-1 floating diffusion (FD) summing mode transfers charges of all four photodiodes of each color (red, green, or blue) of the grouping of photodiodes 214A, 214B to the respective abated floating diffusion 218A, 218B through the respective transfer transistors 216A, 216B. One of the challenges with 4C-1 FD summing mode transfers is that normally, the signal from all four photodiodes is too high to be transferred to a single floating diffusion, or the signal from all four photodiodes is too high to be handled by the circuitry. A solution would have to trade off a low photodiode full well capacity or low conversion gain.

In another configuration, 4C-2 binning mode transfers charges of only two of the four photodiodes of each color (red, green, or blue) of the grouping of photodiodes 214A, 214B to the shared floating diffusion 218A, 218B at a time. Thus, the output signal values would need to be read out separately in time, stored, and then at a later time be summed together in order determine the total signal from the four photodiodes of the same color. As a consequence, image sensor speed would be slowed down significantly because each grouping of photodiodes 214A, 214B, needs to be read out twice to determine the total signal from all fax photodiodes of the same color.

<Readout Control for Phase Detection Pixel>

Figure 3:
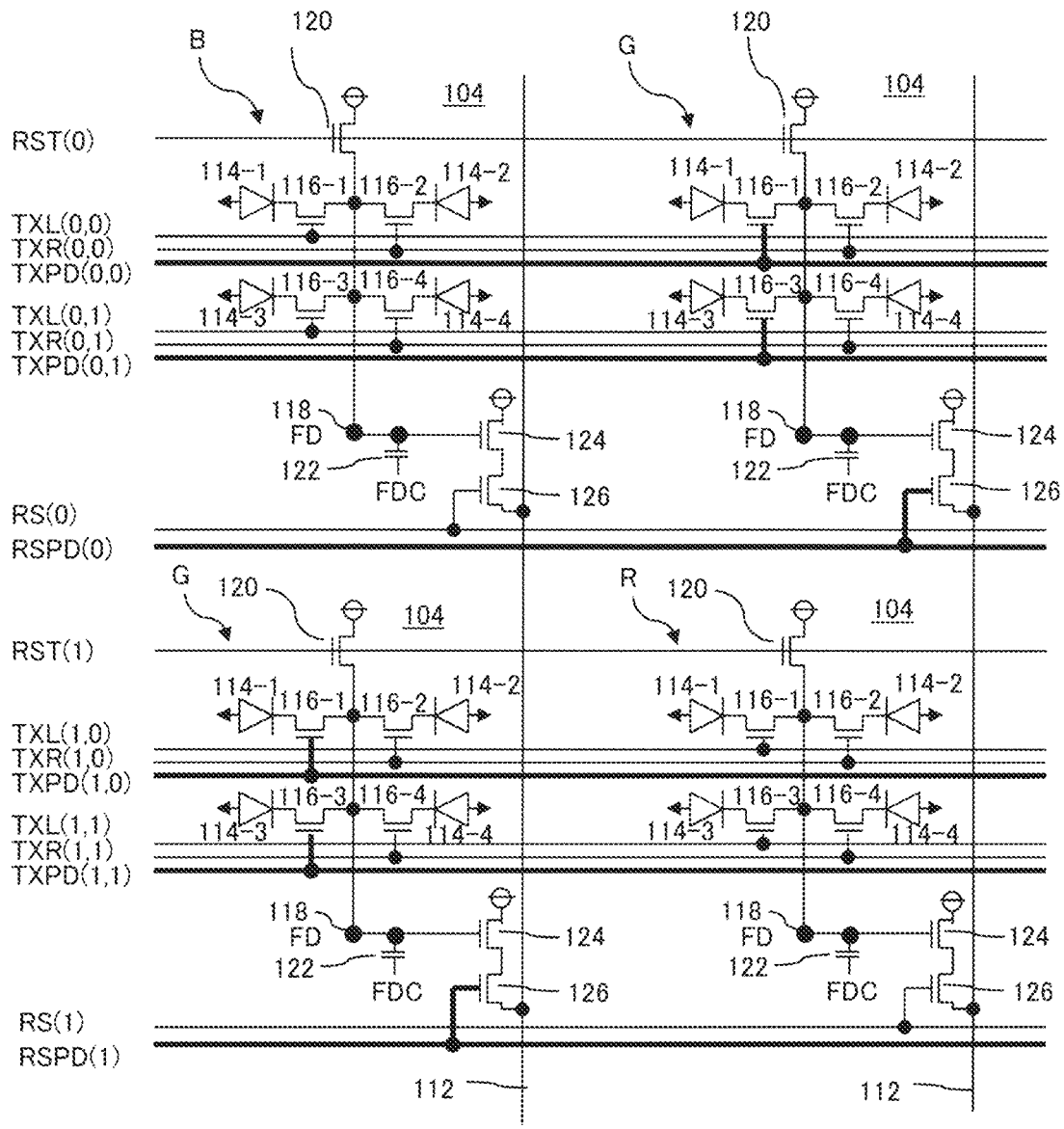
FIG. 3 is a diagram illustrating a circuit configuration of a pixel circuit comprising four pixels, the pixel circuit being the same as the pixel circuit illustrated in FIG. 1B.

FIG. 3 illustrates a circuit configuration of a pixel circuit comprising four pixels, the pixel circuit being the same as the pixel circuit illustrated in FIG. 1B. In the circuit, a phase detection pixel can be divided and read. That is, the phase detection pixel includes a plurality of phase detection autofocus photodiodes, so that phase detection information is acquired from light reception signals from the plurality of phase detection autofocus photodiodes. For example, one pixel is divided to two halves, phases of incident light are detected from the intensities of the light reception signals of one half and the other halt and the detection results are used as data for auto focusing.

Note that, the pixel circuit 104 is controlled by control signals from the control circuitry 110. The control signals are supplied to the transfer transistors of the pixel circuit 104 via various control signal lines which will be described later.

Here, the control circuitry 110 comprise a processor configured to perform necessary calculations in response to various input signals to output the control signals. The processor includes a CPU such as a microcomputer, a ROM, a RAM, and the like, and may be of a type which performs signal processing as digital data processing using the stored programs, or may be of a type which directly processes analog signals.

The circuit in FIG. 3 corresponds to a circuit comprising four pixels arranged in 2×2 in FIG. 2. A pixel at the upper left is a blue (B) pixel, a pixel at the upper right is a green (G) pixel, a pixel at the lower left is a green (G) pixel, and a pixel at the lower right is a red (R) pixel.

A reset line RST(0) in the first row is connected with gates of the reset transistors 120 in the first row.

In one pixel, the four transfer transistors 116-1 to 116-4 are arranged. A transfer control signal line TXL(0,0) is connected with a gate of a transfer transistor TX 116-1 of the B pixel at the upper left, and a transfer control signal line TXR(0,0) is connected with a gate of a transfer transistor TX 116-2 of the B pixel at the upper left and a gate of a transfer transistor DC 116-2 of the G pixel at the upper right. A transfer control signal line TXPD(0,0) is connected with a goo of a transfer transistor TX 116-1 of the G pixel at the upper right.

A transfer control signal line TXL(0,1) is connected with a gate of a transfer transistor TX 116-3 of the upper left pixel, and a transfer control signal line TXR(0,1) is connected with a gate of a transfer transistor TX 116-4 of the upper left pixel and a gate of a transfer transistor TX 116-4 of the upper right pixel. A transfer control signal line TXPD(0,1) is connected with a gale of a transfer transistor TX 116-3 of the upper right pixel.

Note that the transfer signals TX1, TX2, TX3, and TX4 in FIG. 1B correspond to signals to be supplied to the transfer control signal lines TXL(0,0), TXR(0,0), TXL(0,1), and TXR(0,1) in FIG. 3, respectively.

A readout selection signal line RS(0) is connected with a gate of a row select transistor 126 of the upper left pixel, and a readout selection signal line RSPD(0) is connected with a gate of a row select transistor 126 of the upper right pixel.

Also in the next row, a pixel has the same configuration as above, and the same transfer control signal lines ire provided. Also in the column direction, the same configuration is repeated.

Figure 4A:
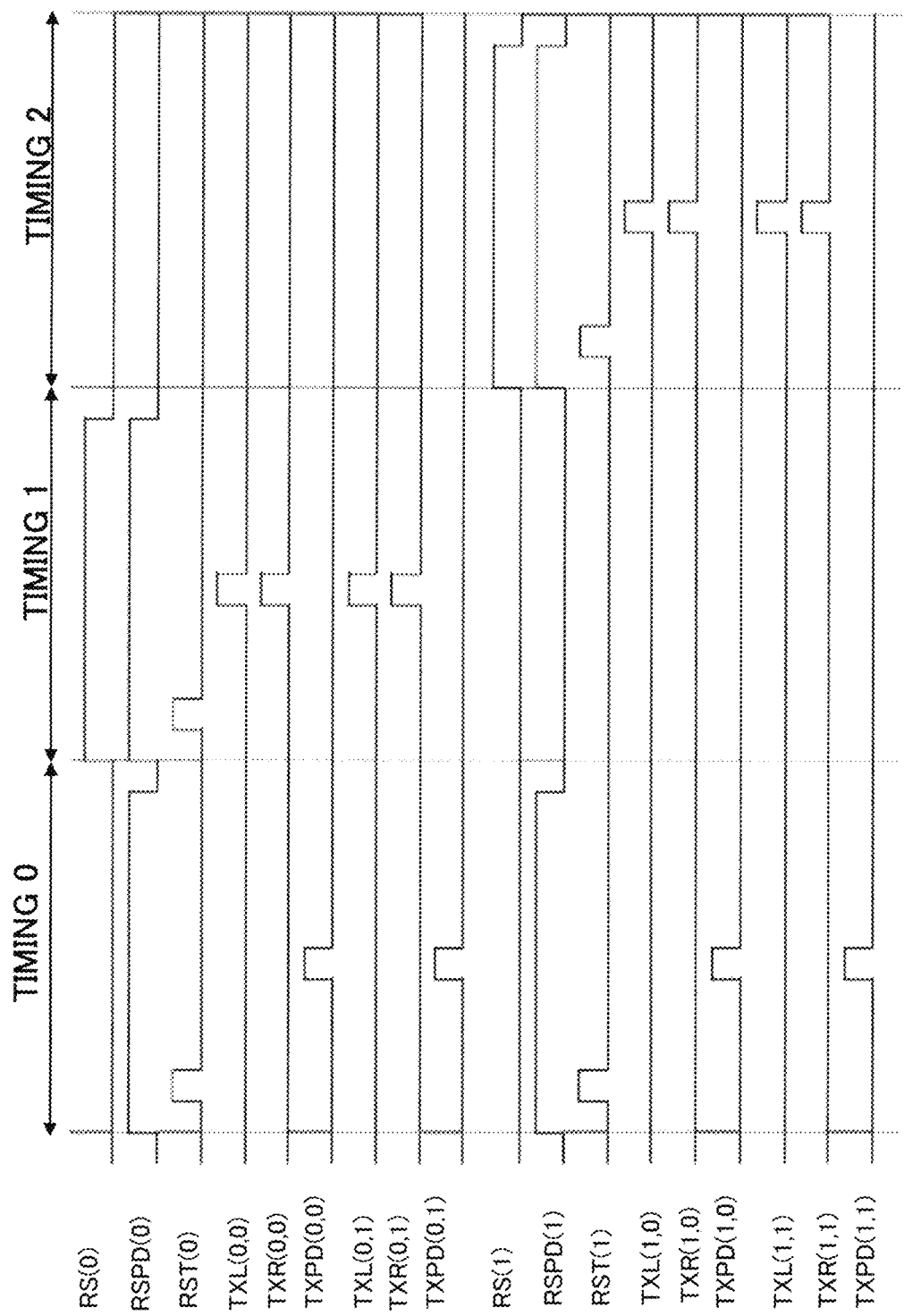
FIG. 4A is a timing chart of signals in a configuration of FIG. 3.
Figure 4B:
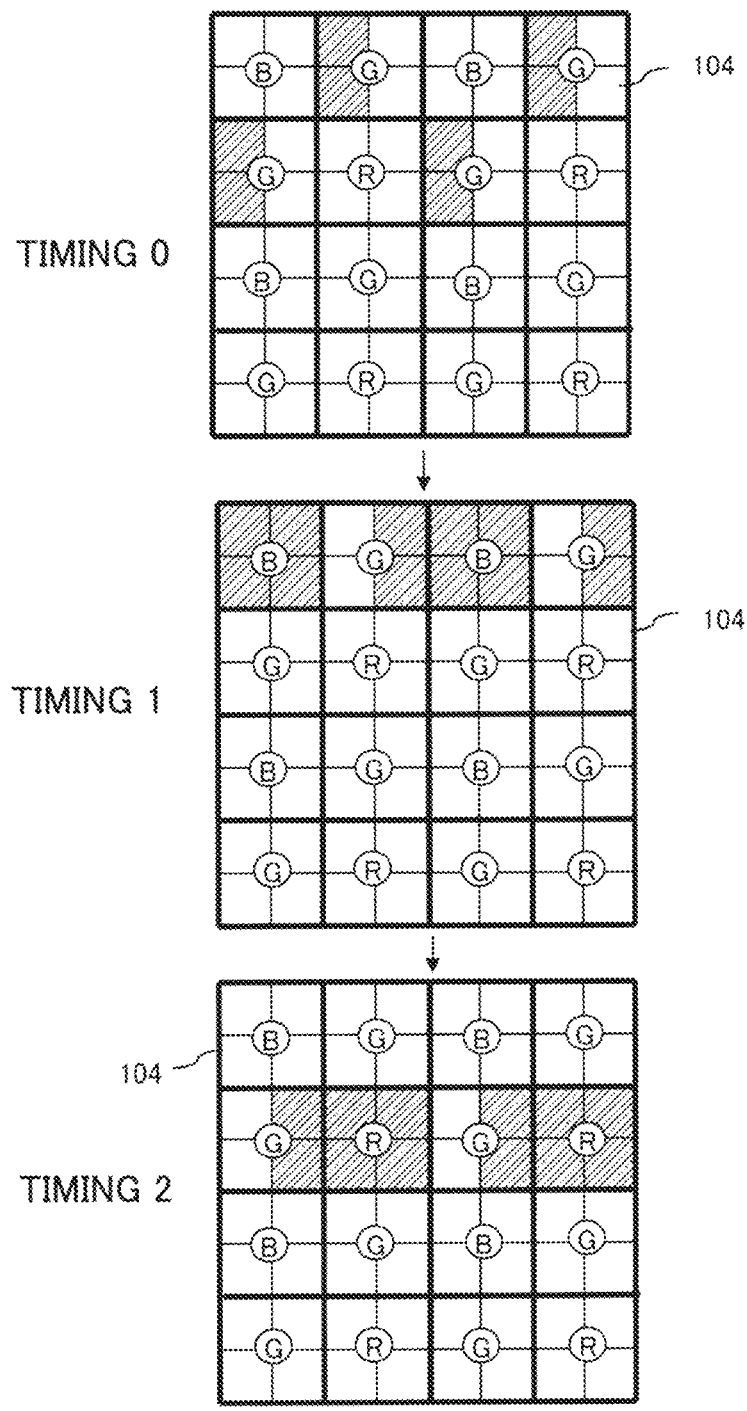
FIG. 4B is a diagram illustrating a readout operation from each pixel.

FIG. 4A is a timing chart of signals in the configuration of FIG. 3. FIG. 4B is a diagram illustrating the readout from each pixel. Note that each pixel comprises four sub-pixels, and one sub-pixel includes one photodiode and one transfer transistor.

First, at timing 0, the RSPD(0) and the RSPD(1) first become H, and in this state, the RST(0) and the RST(1) become H, whereby respective floating diffusions FD are reset, and the outputs of the respective-source follower transistors 124 are also brought into a reset state.

Next, after the RST(0) and the RST(1) are returned to L, the transfer control signal lines TXPD(0,0), TXPD(0,1), TXPD(1,0), and TXPD(1,1) are turned on. This turns on the transfer transistors 116-1 and 116-3 of each of the upper right and lower left G pixels. Thus, a charge of a left half of each G pixel which is indicated by hatched lines in FIG. 4B is read out via the corresponding floating diffusion FD.

Note that since the signal from each pixel (photodiode arranged in each pixel) is react out by the transfer control signal lines, the transfer control signal lines correspond to readout control lines.

At timing 1 which is the next readout cycle, after being reset, the transfer control signal lines TXL(0,0), TXR(0,0), TXL(0,1), and TXR(0,1) become H. Thus, each B pixel in the first row and a right half of each G pixel in the first row are read, which are indicated by hatched lines in FIG. 4B.

At timing 2 which is the next readout cycle, after being reset, the transfer control signal fines TXL(1,0), TXR(1,0), TXL(1,1), and TXR(1,1) become H. Thus, each R pixel in the second row and a right half of each G pixel in the second row are read, which are indicated by hatched lines in FIG. 4B.

In this manner, as for the pixels in the two rows, it is possible to end the readout of the phase detection information of the G pixels and the readout of charges of the B pixels and the R pixels, i.e., image signals in the three readout cycles.

In addition, the image signal of the G pixel can be acquired by summing signals from the two divisions of the G pixel, and both of a phase detection autofocus signal and the image signals from all of the pixels are output as outputs from the function logic 108.

Note that in FIG. 3, two columns and in FIG. 4B, four columns are illustrated in the row direction, but have the same configuration in the row direction so that each signal can be read out in the corresponding bit line 112.

Then, the readout is performed every two rows while moving in a downward direction, whereby the phase detection signals and the image signals can be read out from all of the pixels.

"Modified Example of Readout"

Figure 5:
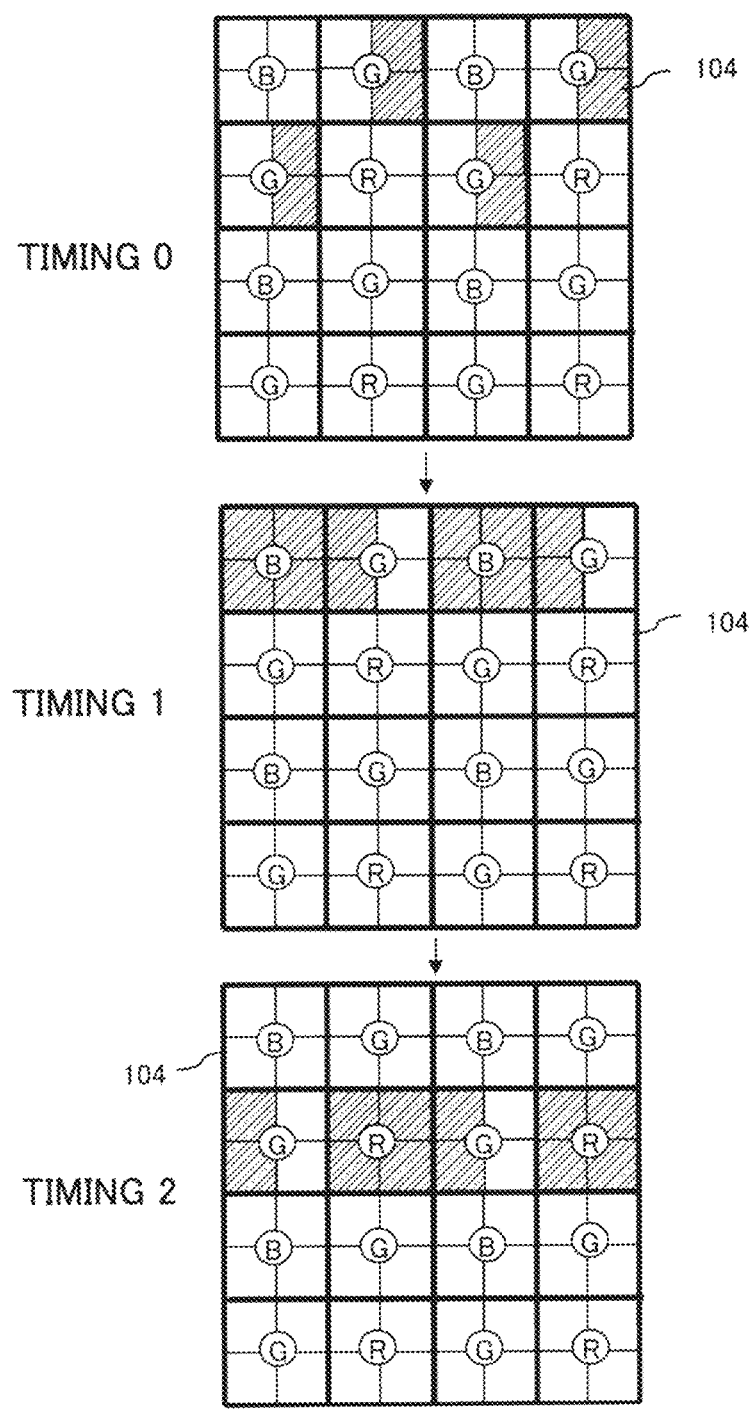
FIG. 5 is a diagram illustrating a modified example of a readout operation from each pixel.

FIG. 5 is a diagram illustrating a modified example of the readout. In this example, at timing 0, a right-side half of each G pixel is first read. Then, at timing 1, each B pixel and a left-side half of each G pixel in the first row am read, and at timing 2, each R pixel and a left-side half of each G pixel in the second row are read. That is, in the example of FIG. 4, the left half of each G pixel is first read, whereas in the example of FIG. 5, the right half of each G pixel is first read.

Figure 6:
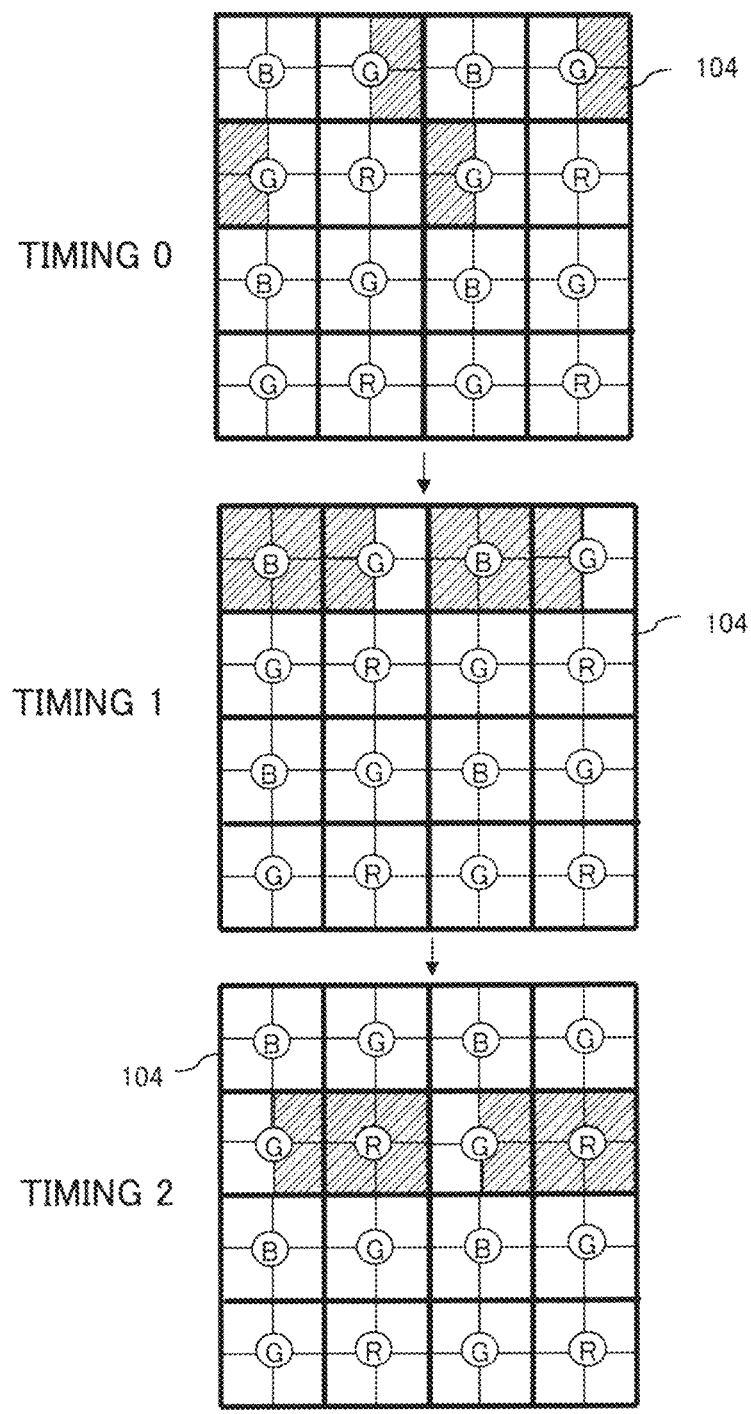
FIG. 6 is a diagram illustrating one example in which as for G pixels, the respective right halves are first read in the first row and the respective left halves are first read in the second row.

FIG. 6 illustrates a middle example of the examples in FIGS. 4 and 5, and as for the G pixels, the respective right haves are first reed in the first row and the respective left halves are first read in the second row.

Figure 7:
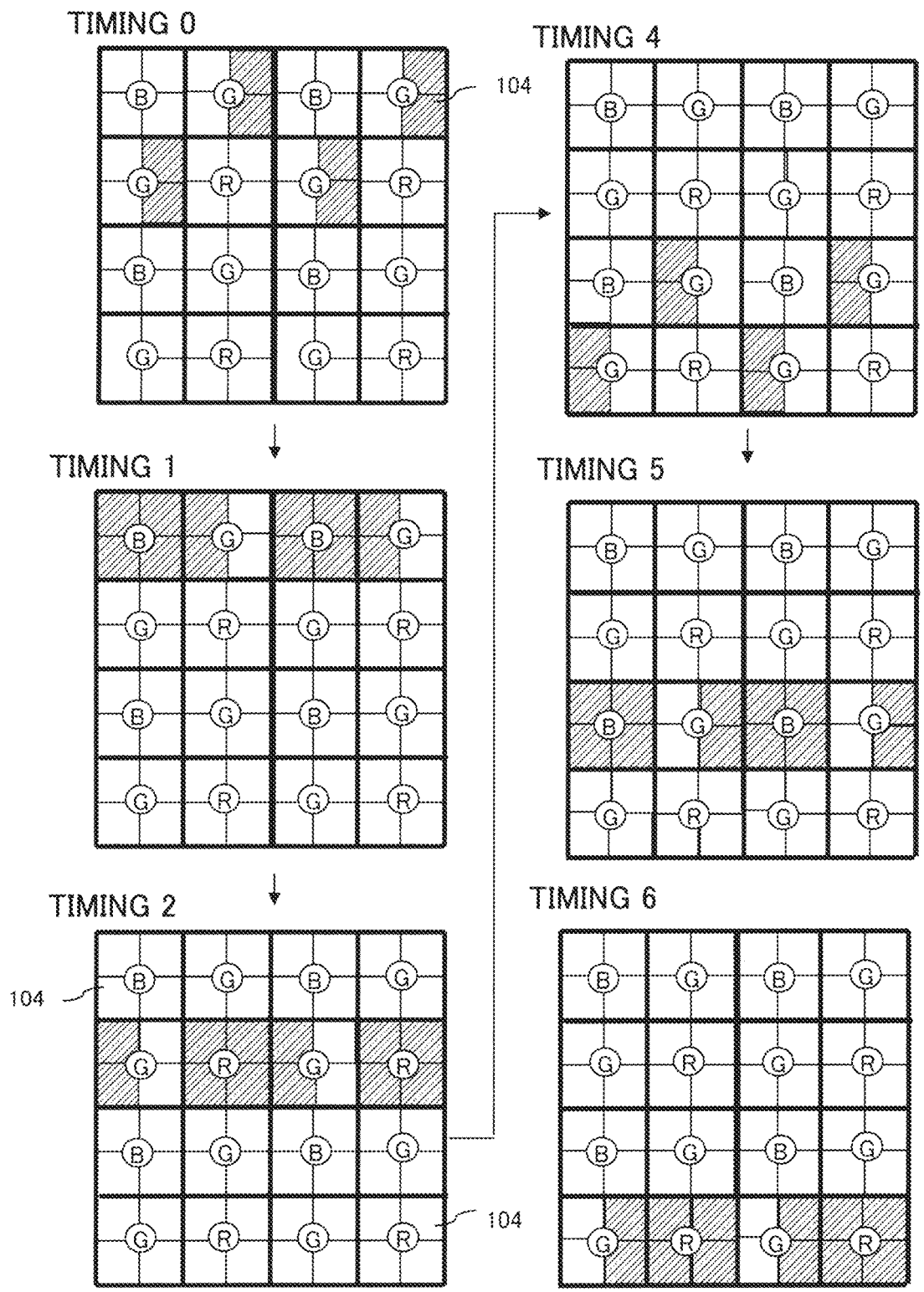
FIG. 7 is a diagram illustrating one example in which, in the first three cycles, the right-side half of each G pixel is first read, and in the next three cycles, the left-side half of each G pixel is first read.

In FIG. 7, in the first three cycles, the right-side half of each G pixel is first read, and in the next three cycles, the left side half of each G pixel is first read.

Figure 8A:
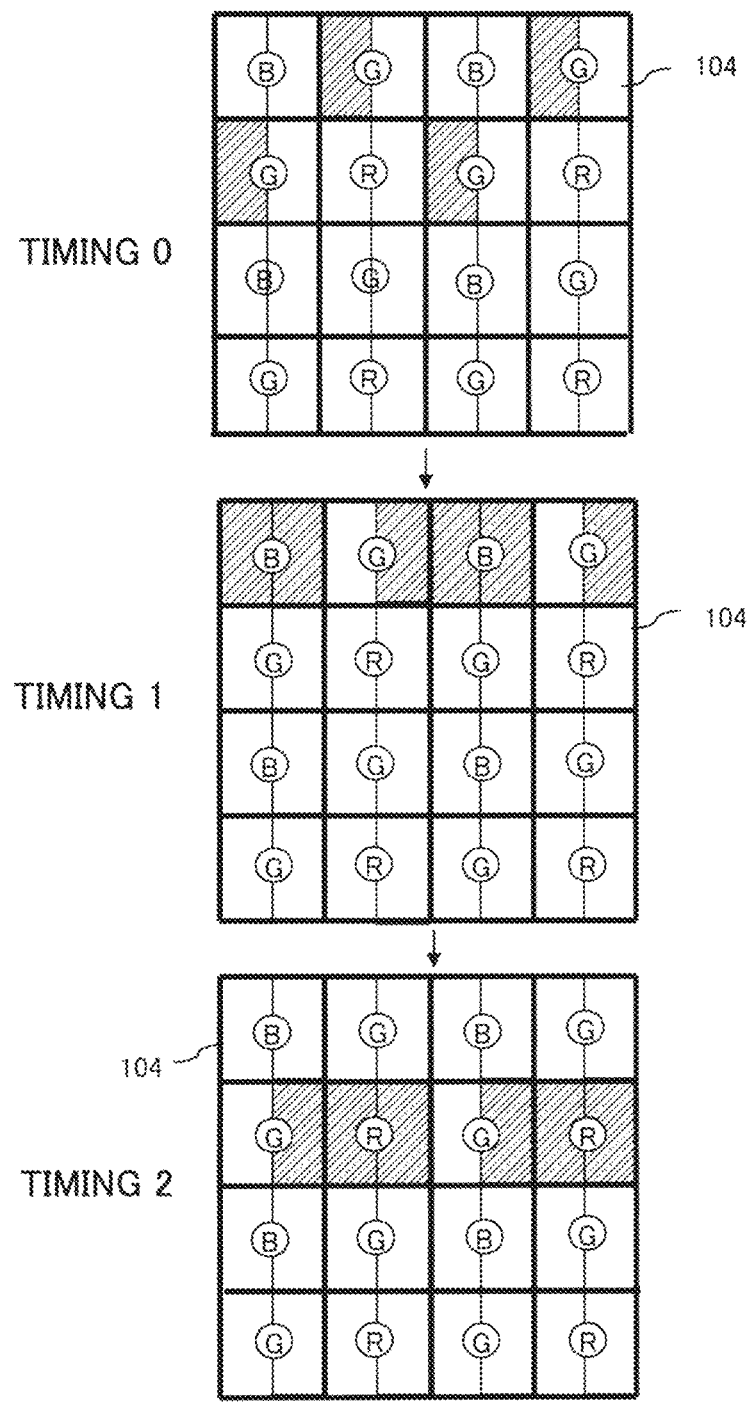
FIG. 8A is a diagram illustrating a readout operation in one example in which one pixel is divided into two sub-pixels.
Figure 8B:
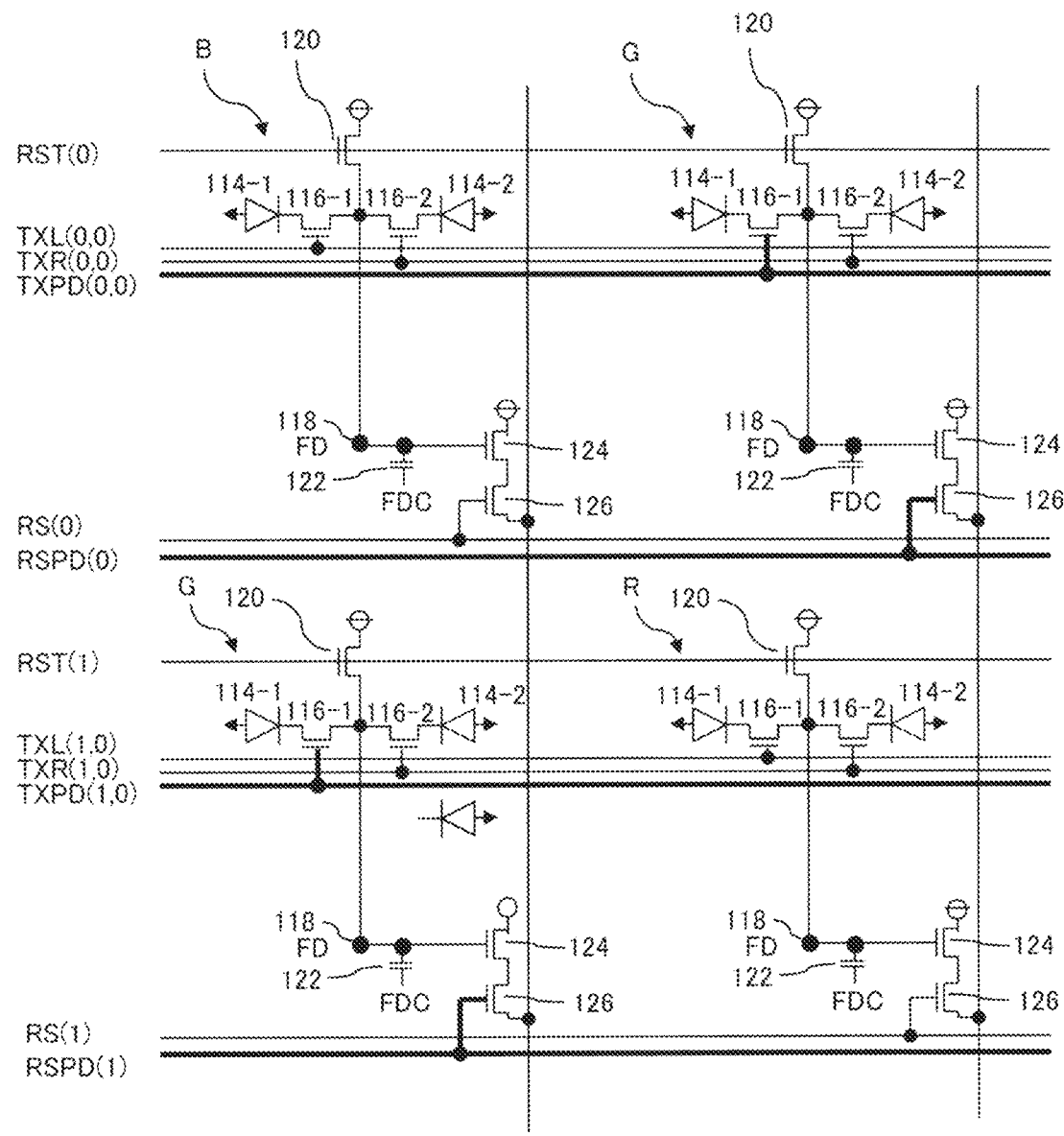
FIG. 8B is a circuit diagram of one example in which one pixel is divided into two sub-pixels.

FIGS. 8A and 8B illustrate one example in which one pixel is divided into two sub-pixels, in which FIG. 8A is a diagram illustrating a readout operation, and FIG. 8B is a circuit diagram.

In this example, in one pixel, two transfer transistors 116-1 and 116-2 are arranged. A transfer control signal line TXL(0,0) is connected with a gate of a transfer transistor TX 116-1 of the B pixel at the left side, and a transfer control signal line TXR(0,0) is connected with a gate of a transfer transistor TX 116-2 of the B pixel at the left side and a gate of a transfer transistor TX 116-2 of the G pixel at the right side. A transfer control signal line TXPD(0,0) is connected with a game of a transfer transistor TX 116-1 of the G pixel at the right side.

Such a configuration also makes it possible to acquire image signals and phase detection signals by the same operation as illustrated in FIGS. 3 and 4.

Figure 9:
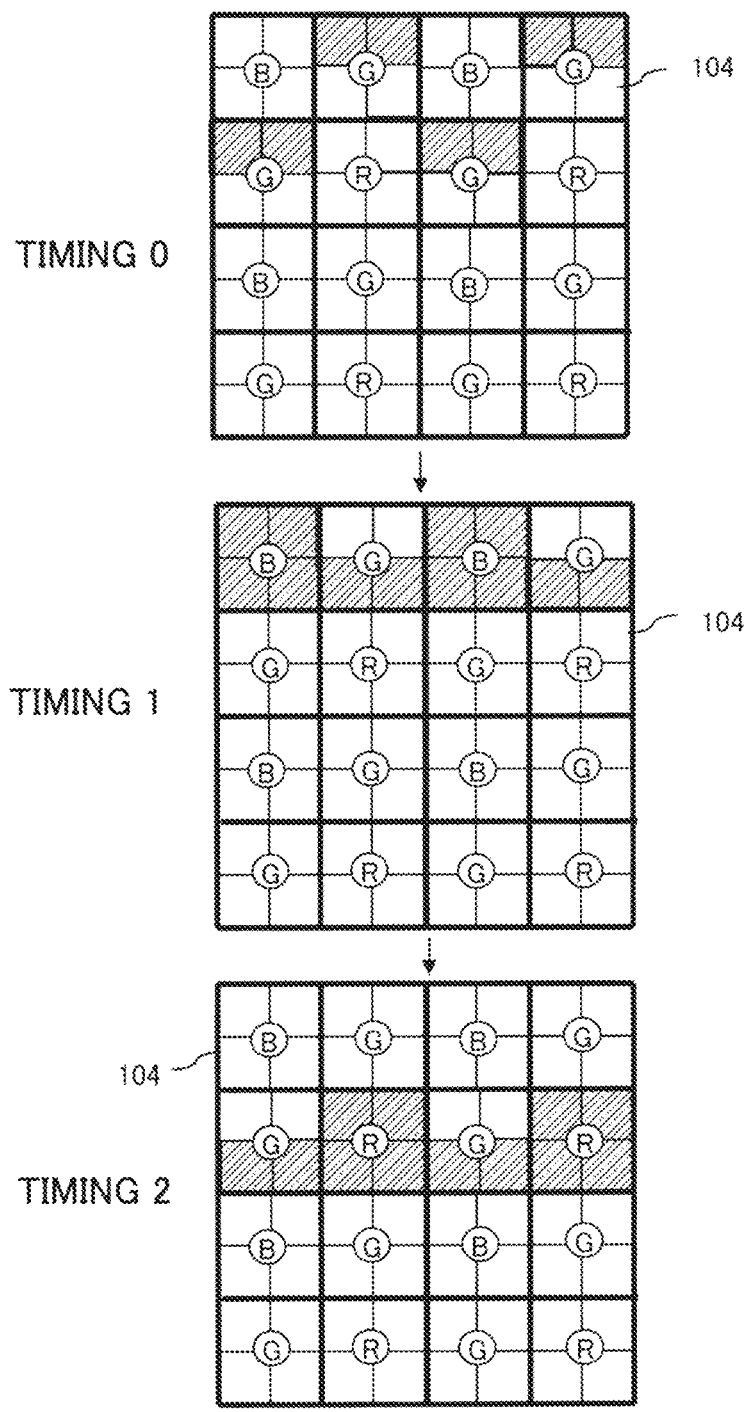
FIG. 9 is a diagram illustrating a readout operation in one example in which one pixel is divided into four sub-pixels, and the G pixel is divided into two upper and lower halves.

FIG. 9 is a diagram illustrating one example in which one pixel comprises four sub-pixels in the same manner as illustrated in FIG. 4A and the like, in which the G pixel is divided into two upper and lower halves. This example also makes it possible to acquire both of image signals and phase detection signals for the pixels in the two rows in the three cycles in the same manner as the division into the two left and right halves.

Figure 10:
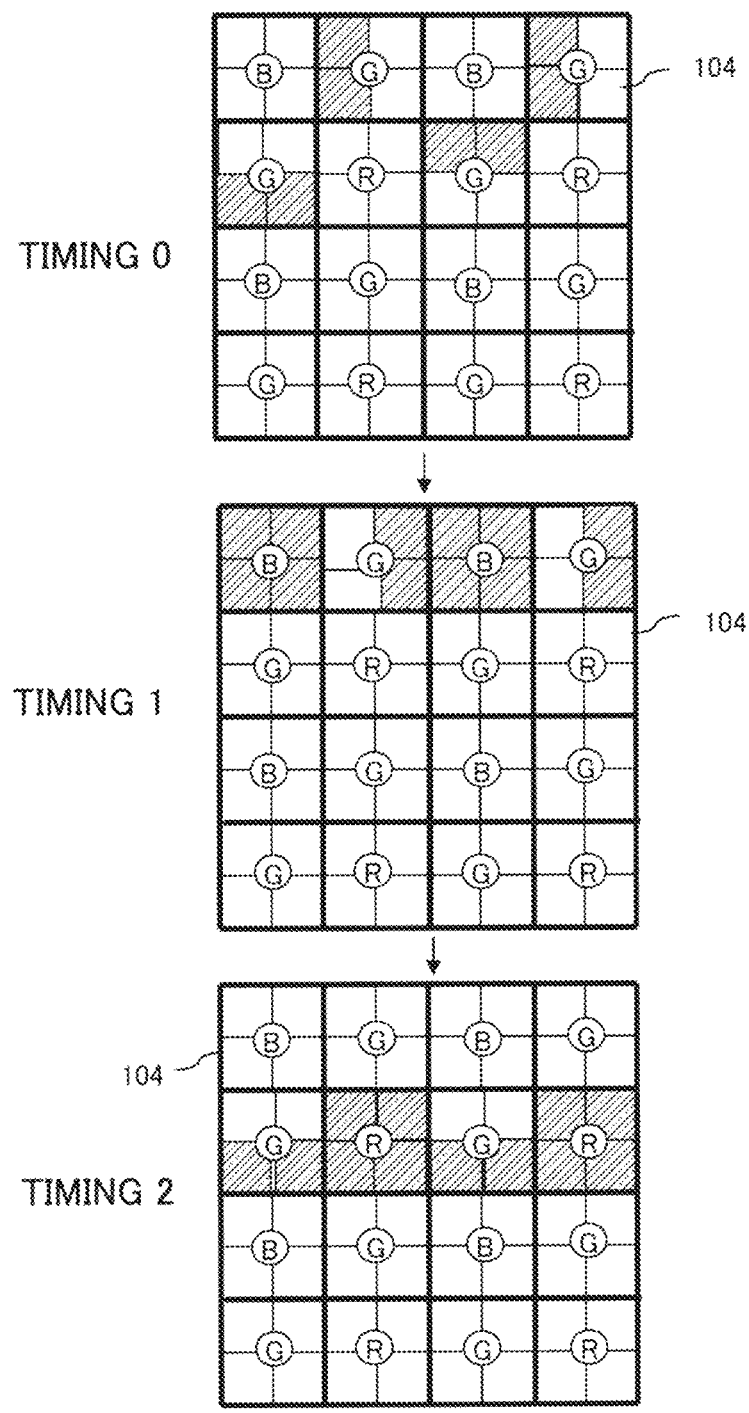
FIG. 10 is a diagram illustrating a readout operation in one example in which there coexist pixels each divided into loft and right halves and pixels each divided into upper and lower halves.

FIG. 10 illustrates one example in which there coexist pixels each divided into left and right halves and pixels each divided into upper and lower halves.

Figure 11:
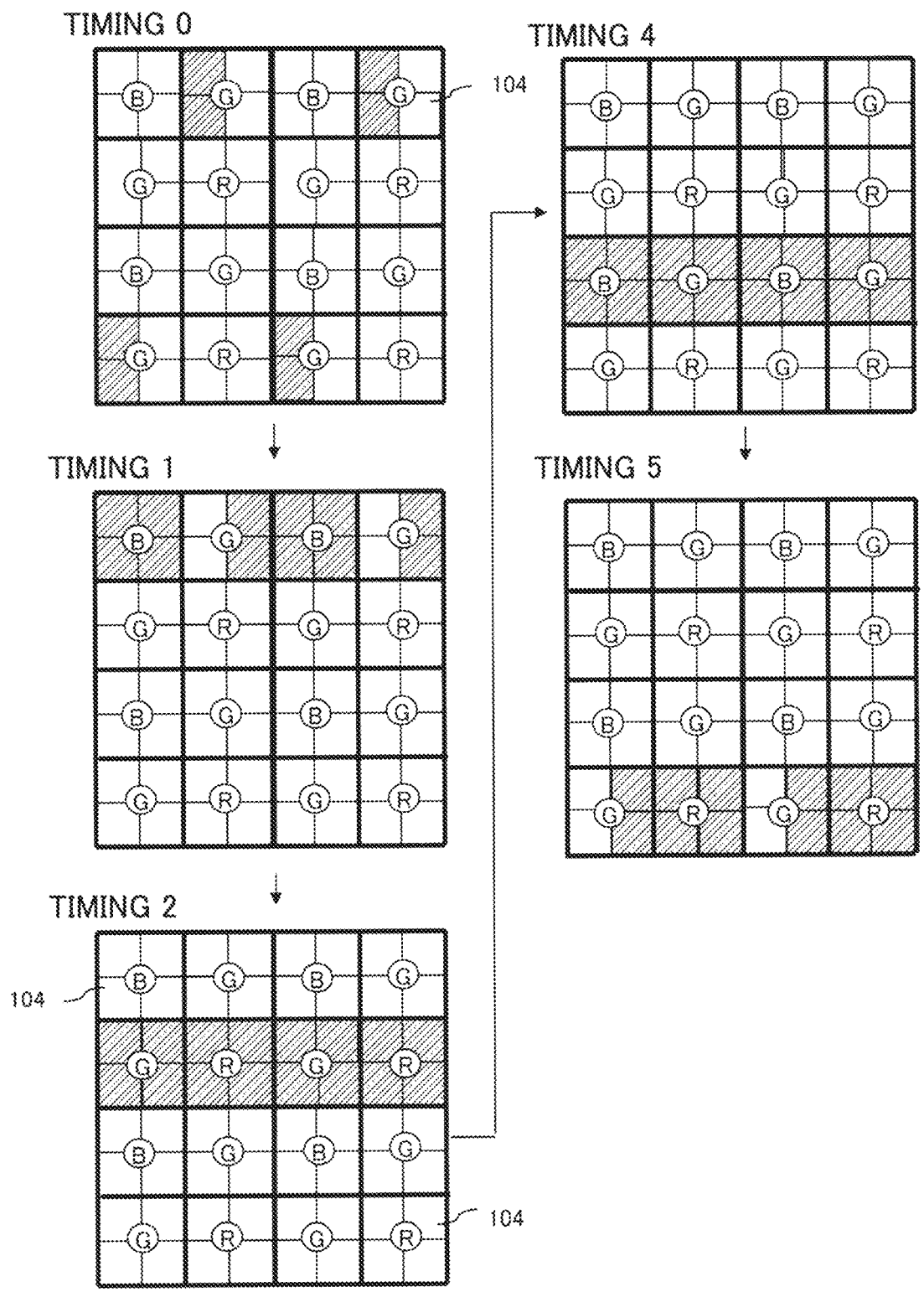
FIG. 11 is a diagram illustrating a readout operation in one example in which readout is performed for four rows as a readout unit, and as for the readout in the middle two rows, the G pixels are also read every one pixel.

FIG. 11 illustrates one example in which readout is performed for four rows as a readout unit, and as for the readout in the middle two rows, the G pixels are also read every one pixel. In this manner, the reduced number of phase detection pixels can result in reduction in total readout time. That is, the readout for the four rows can end with five cycles.

Figure 12:
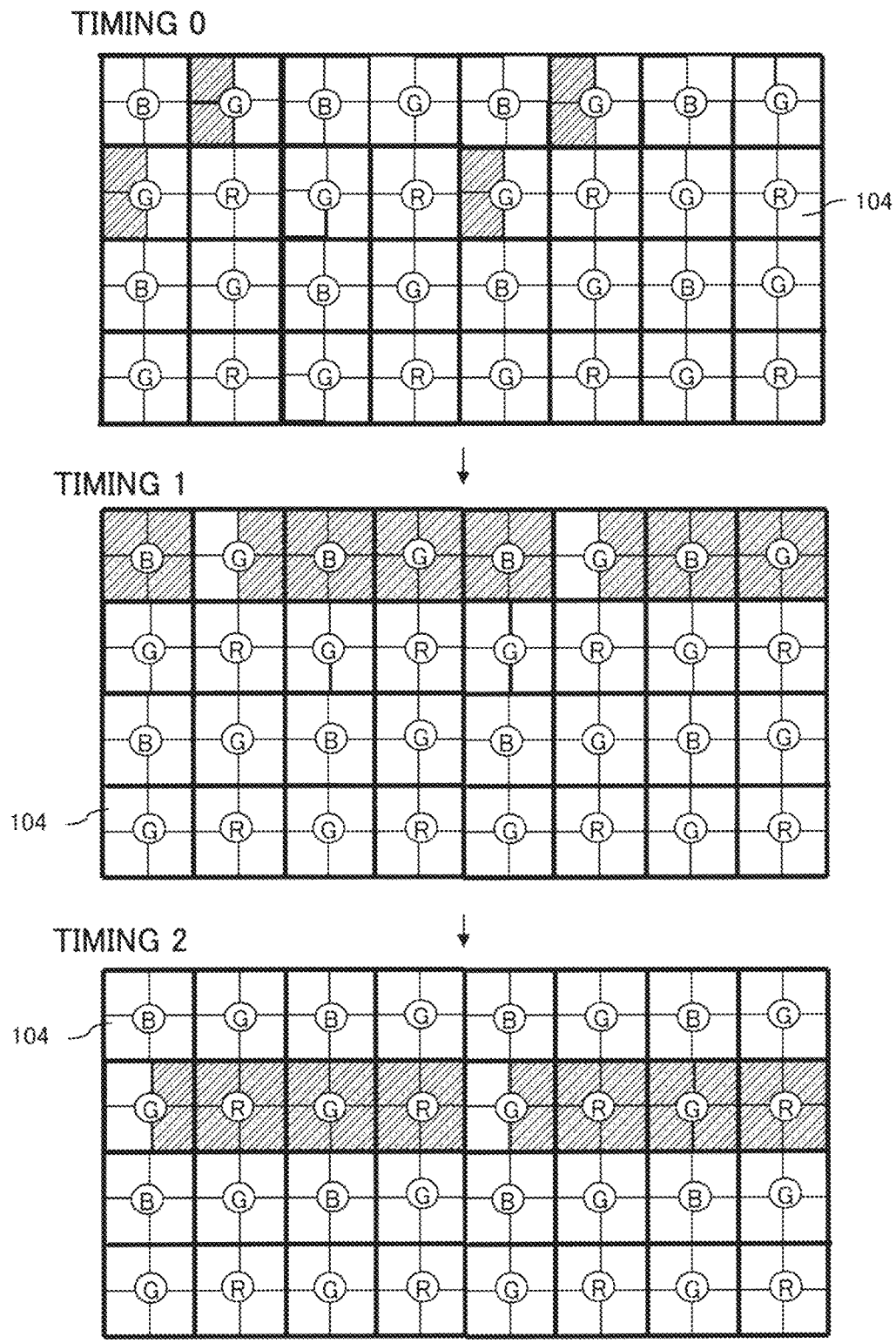
FIG. 12 is a diagram illustrating a readout operation in one example in which the number of phase detection pixels is reduced in a row direction, and four phase detection pixels are provided in eight G pixels arranged in two rows×four columns.

FIG. 12 illustrates one example in which the number of phase detection pixels is reduced in the row direction, in which four phase detection pixels are provided in eight G pixels arranged is two rows and four columns. In this case, the phase detection pixels are not provided in the two columns of the four columns.

Figure 13A:
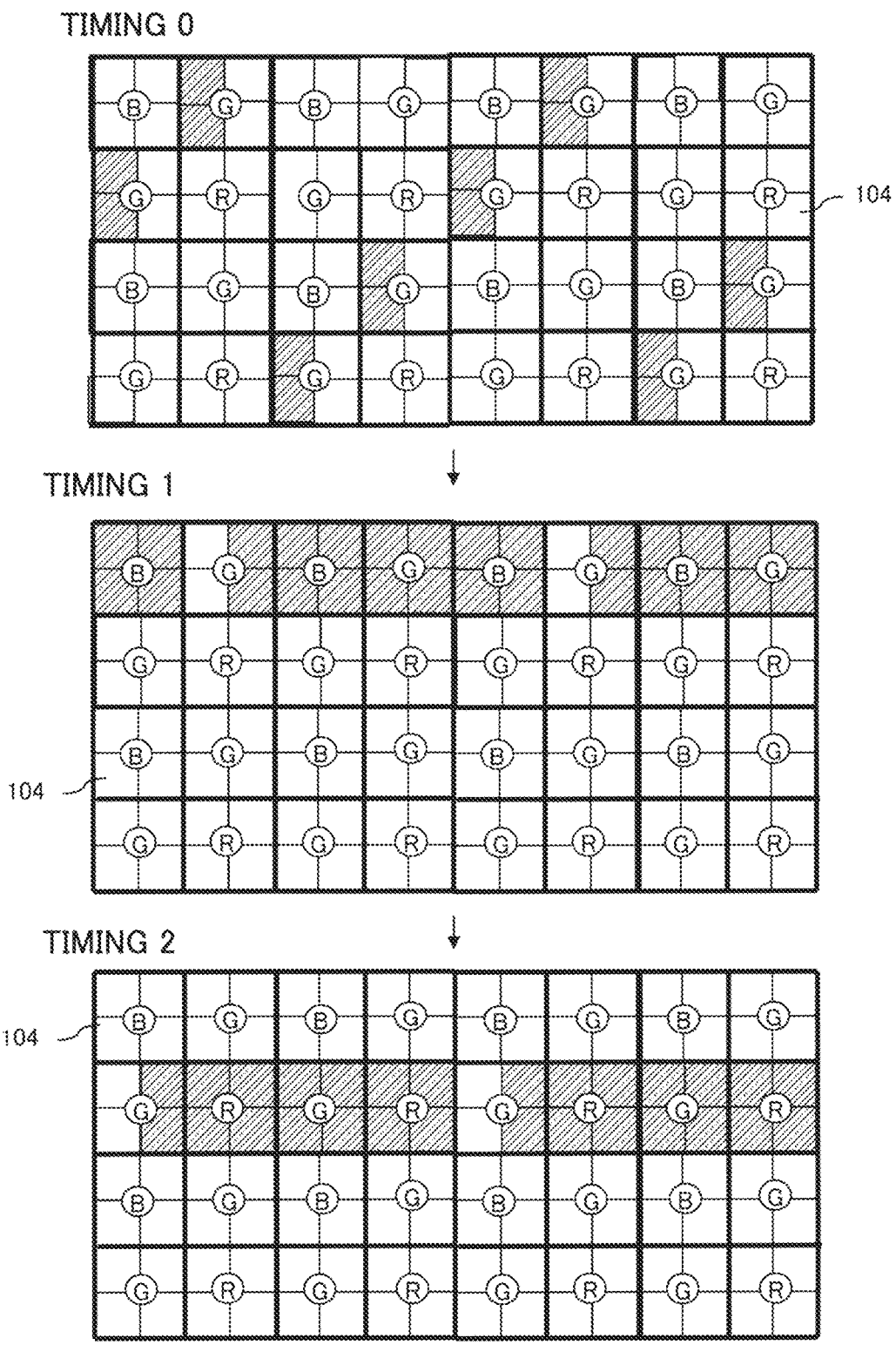
FIG. 13A is a diagram illustrating a readout-operation (first half) in the case where eight pixels in 16 G pixels serve as the phase detection pixels with four rows and eight columns as a unit.
Figure 13B:
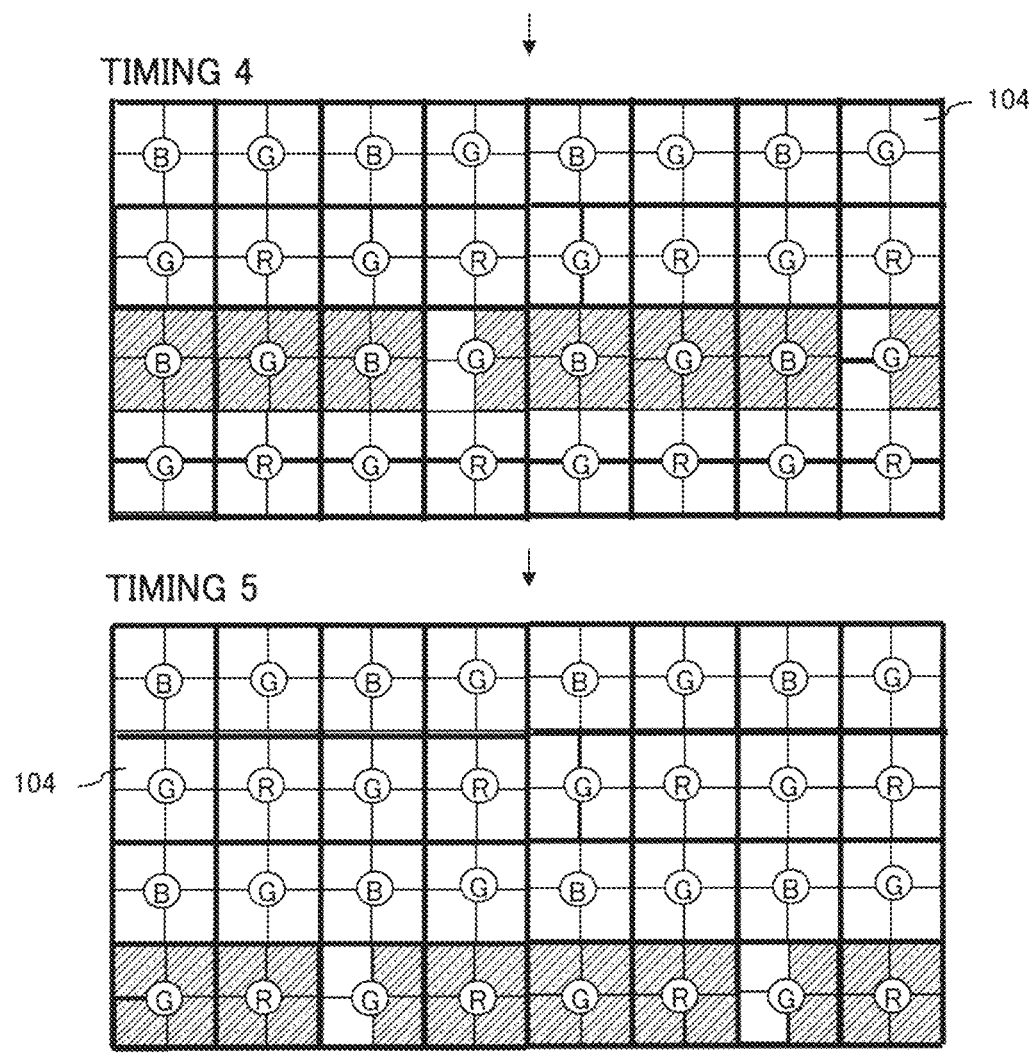
FIG. 13B is a diagram illustrating a readout operation (second half) in the case where eight pixels in 16 G pixels serve as the phase detection pixels with four rows and eight columns as a unit.

FIGS. 13A and 13B illustrate one example in which eight pixels of 16 G pixels serve as the phase detection pixels with four rows and eight columns as a unit. According to this example, the phase detection pixels can be arranged in each row.

Figure 14:
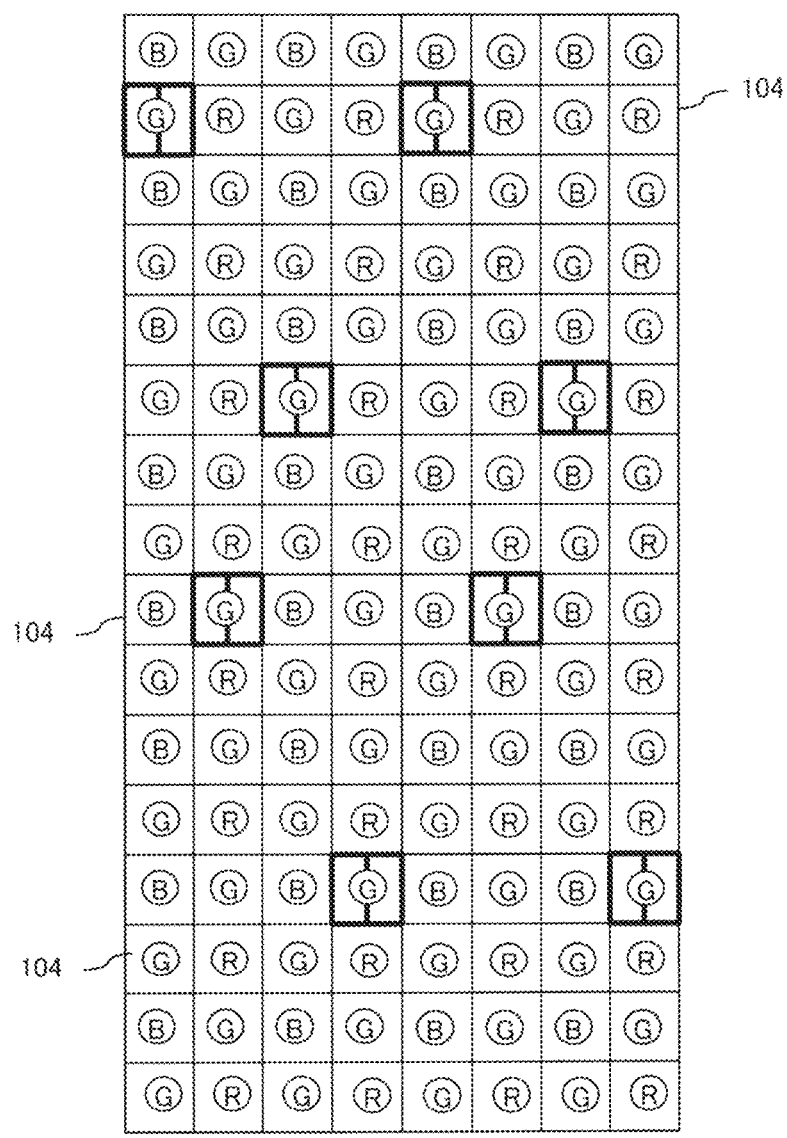
FIG. 14 is a diagram illustrating a readout operation in the case where 16 rows and eight columns serve as a unit.

FIG. 14 illustrates one example in which 16 rows and eight columns serve as a unit. Eight pixels of 64 G pixels serve as the phase detection pixels, and are arranged in the respective columns and four rows. In this case, in the first readout cycle (timing 0), one half of each of the eight phase detection pixels is read, and from the next readout cycle, image pixels which have not been read are read one row at a time and, if there are the phase detection pixels in the row, the other half of each of the phase detection pixels in which the one half has been read is read. Accordingly, the readout for the 16 rows can end with 17 cycles.

Figure 15:
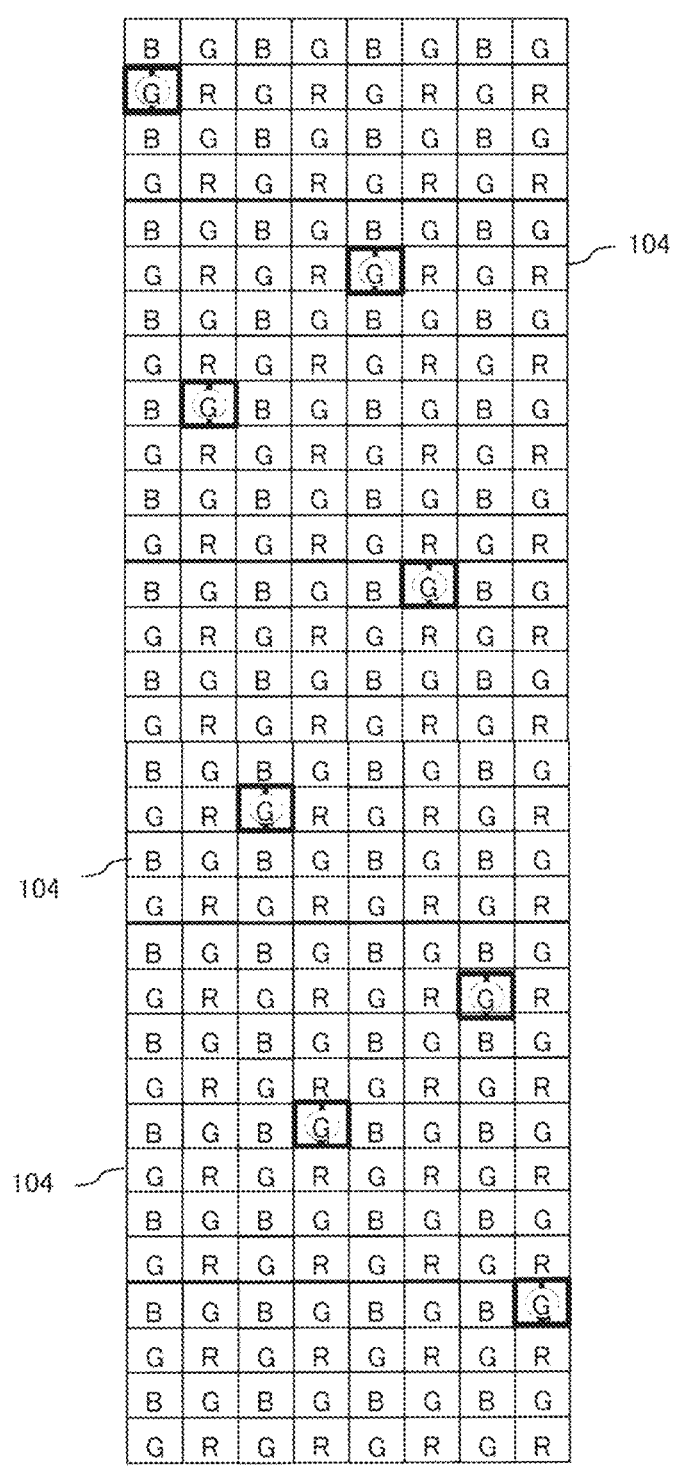

FIG. 15 illustrates one example in which 32 rows and eight columns serve as a unit. Eight pixels of 128 G pixels serve as the phase detection pixels, and are arranged in the respective columns. In this case, the readout for the 32 rows can end with 33 cycles.

Note that in FIGS. 14 and 15, the phase detection pixel is indicated by a bold line.

"Configuration of 16C Cells"

In the above-described example, one pixel which receives light through one color filter comprises 2×2=4 stab pixels (4C) or 2×1=2 sub-pixels (2C).

In this example, one pixel has a 16C configuration in which 4×4=16 sub-pixels (16C) receive light through one color filter.

Figure 16A:
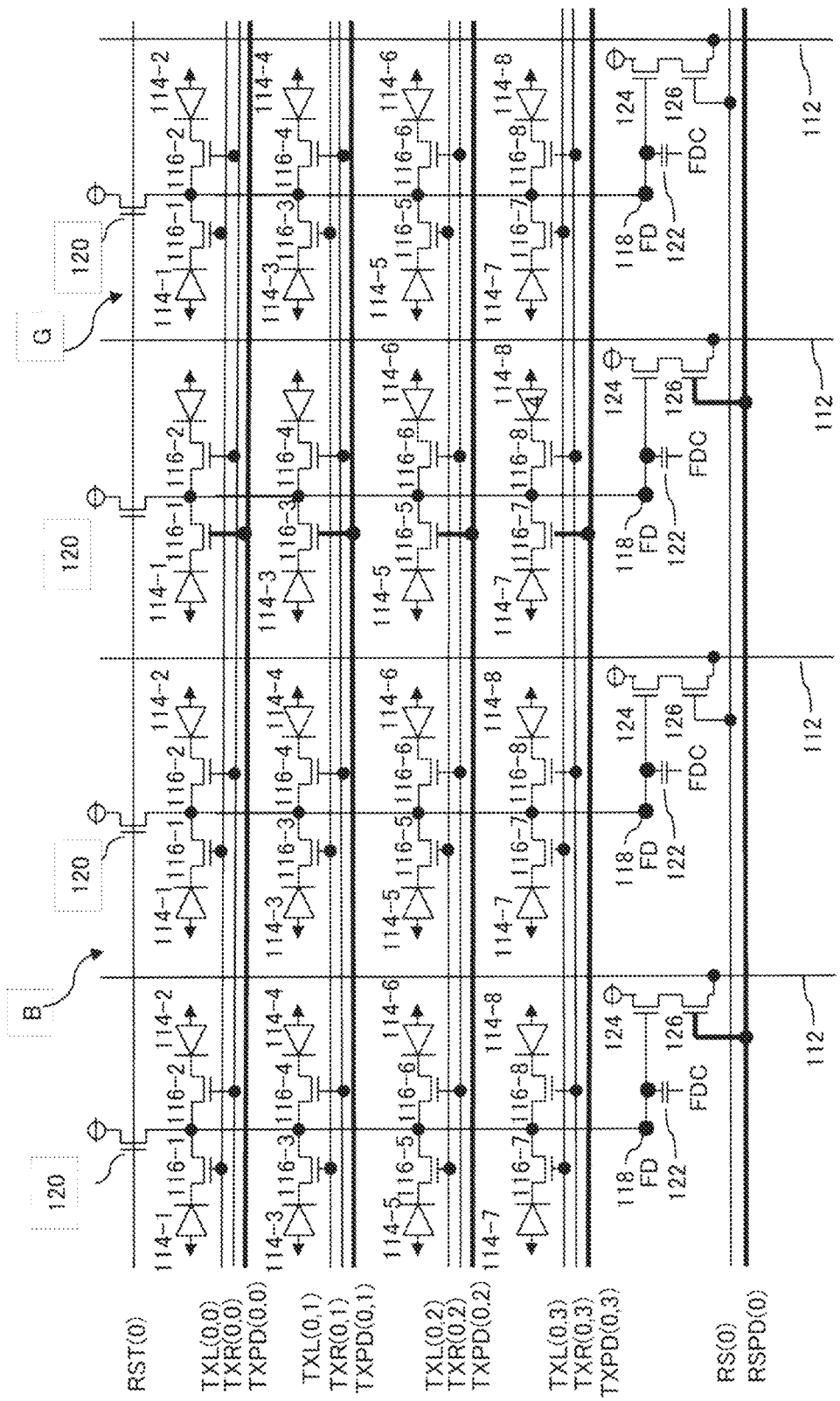
FIG. 16A is a diagram illustrating a circuit configuration of B and G pixels in the first row in the case of a configuration of 16C cells.
Figure 16B:
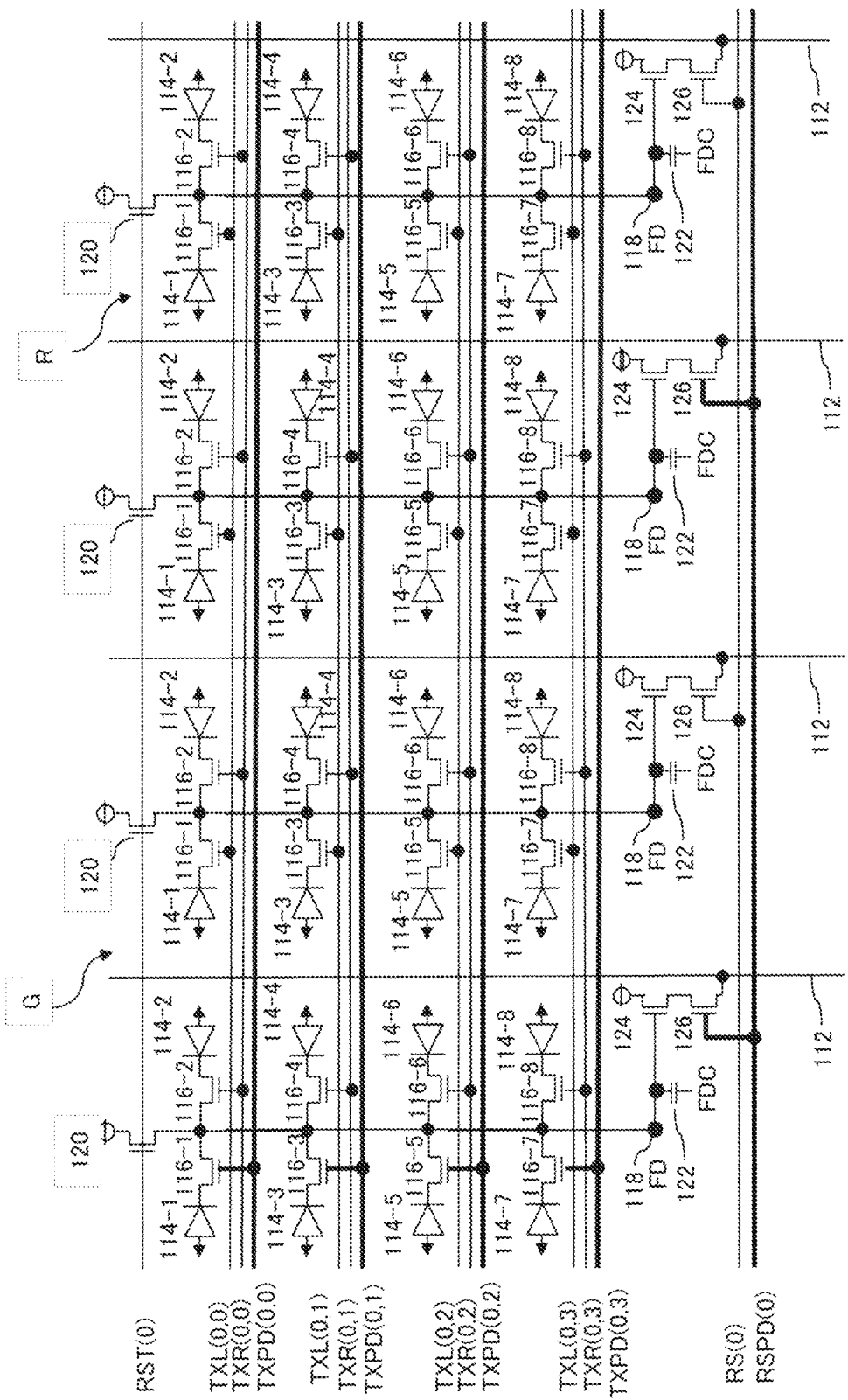
FIG. 16B is a diagram illustrating a circuit configuration of G and R pixels in the second row in the case of a configuration of 16C cells.

FIGS. 16A and 16B are diagrams illustrating a circuit configuration of four pixels in total in which B and G pixels are provided in the first row and G and R pixels are provided in the second, row.

As illustrated in FIG. 16A, in one pixel, eight transfer transistors 116-1 to 116-8 are arranged. The eight transfer transistors 116-1 to 116-8 control outputs of signals from eight photodiodes 114-1 to 114-8, respectively. A reset transistor 120, a source follower transistor 124, a row select transistor 126, and the bake are the same as those illustrated in FIG. 3.

A transfer control signal line TXL(0,0) is connected with gates of two transfer transistors TX 116-1 of the B pixel and a gate acne transfer transistor TX 116-1 of the G pixel, and a transfer control signal line TXR(0,0) is connected with gates of two transfer transistors TX 116-2 of the B pixel and gates of two transfer transistors TX 116-2 of the G pixel.

A transfer control signal line TXPD(0,0) is connected with a gate of a transfer transistor TX 116-1 of the G pixel.

Each of transfer control signal lines TXL(0,1), TXR(0,1), TXPD(0,1), TXL(0,2), TXPD(0,2), TXL(0,3), TXR(0,3), TXPD(0,3) is also connected with the corresponding one(s) of the transfer transistors 116-3 to 116-8 oldie corresponding sub-pixel, in the same manner.

Furthermore, FIG. 16B illustrates the G pixel and the R pixel in the second row, and the connection to the transfer control signal lines TX in the G pixel in the second row is the same as that in the G pixel in the first row, and the connection td the transfer control signal lines TX in the R pixel in the second row is the same as that in the B pixel in the first row.

In the same manner as illustrated in FIG. 4, at timing 0, the TXPDs in the first row and the second row are set to H, at timing 1, the TXR and TXL in the first row are set to H, and at timing 1, the TXR and TXL in the second row are set to H, whereby the imago signals and the phase detection signals can be read out with respect to the pixels in the two rows.

Figure 17:
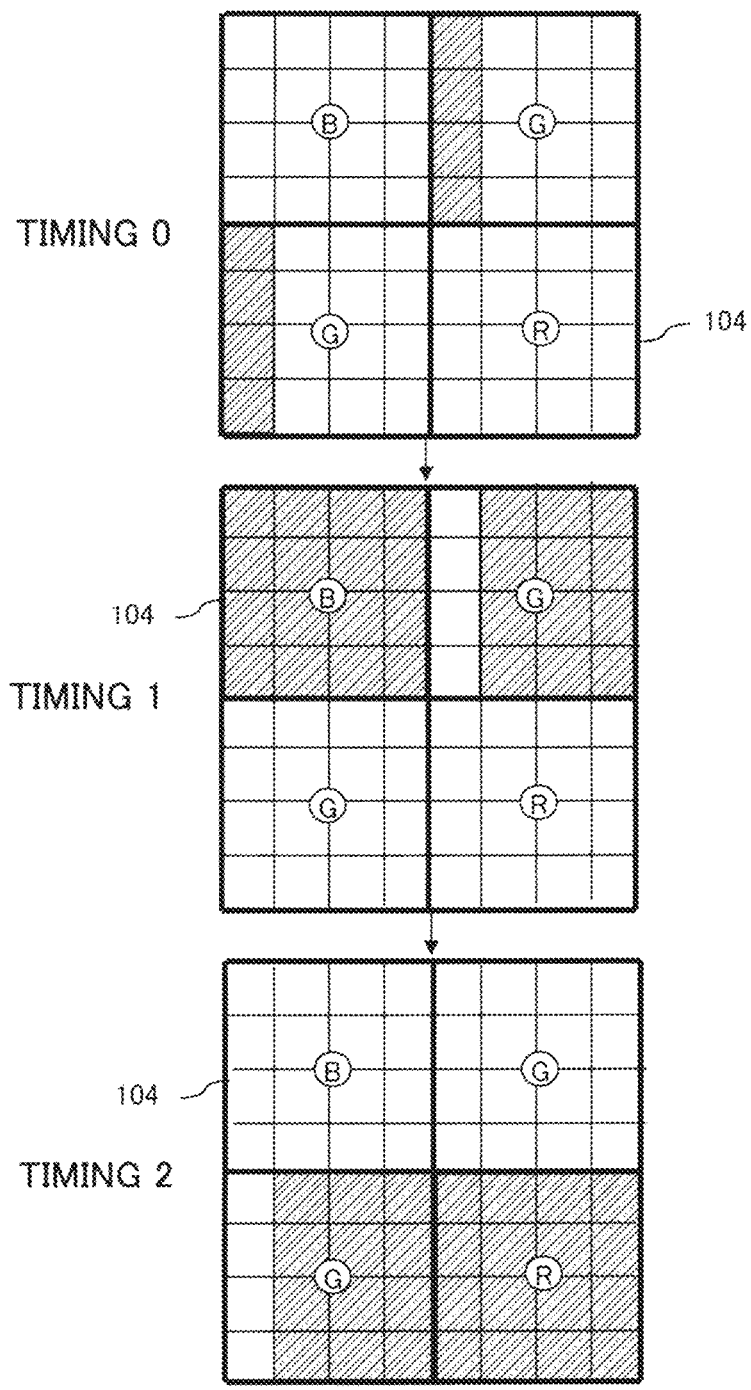
FIG. 17 is a diagram illustrating a readout operation from each pixel in the circuit configuration of FIGS. 16A and 16B.

FIG. 17 is a diagram illustrating a readout operation from each pixel in the circuit configuration of FIGS. 16A and 16B.

At timing 0, four sub-pixels in the left-side one column of each of two G pixels in the respective first and second rows are read. At timing 1, the B pixel and sub-pixels in the remaining three columns of the G pixel in the first row are read, and at timing 2, sub-pixels in the remaining three columns of the G pixel and the R pixel in the second row are read.

In this way, the readout can be performed in the same manna as illustrated in FIG. 4B.

"Modified Example of Readout"

Figure 18:
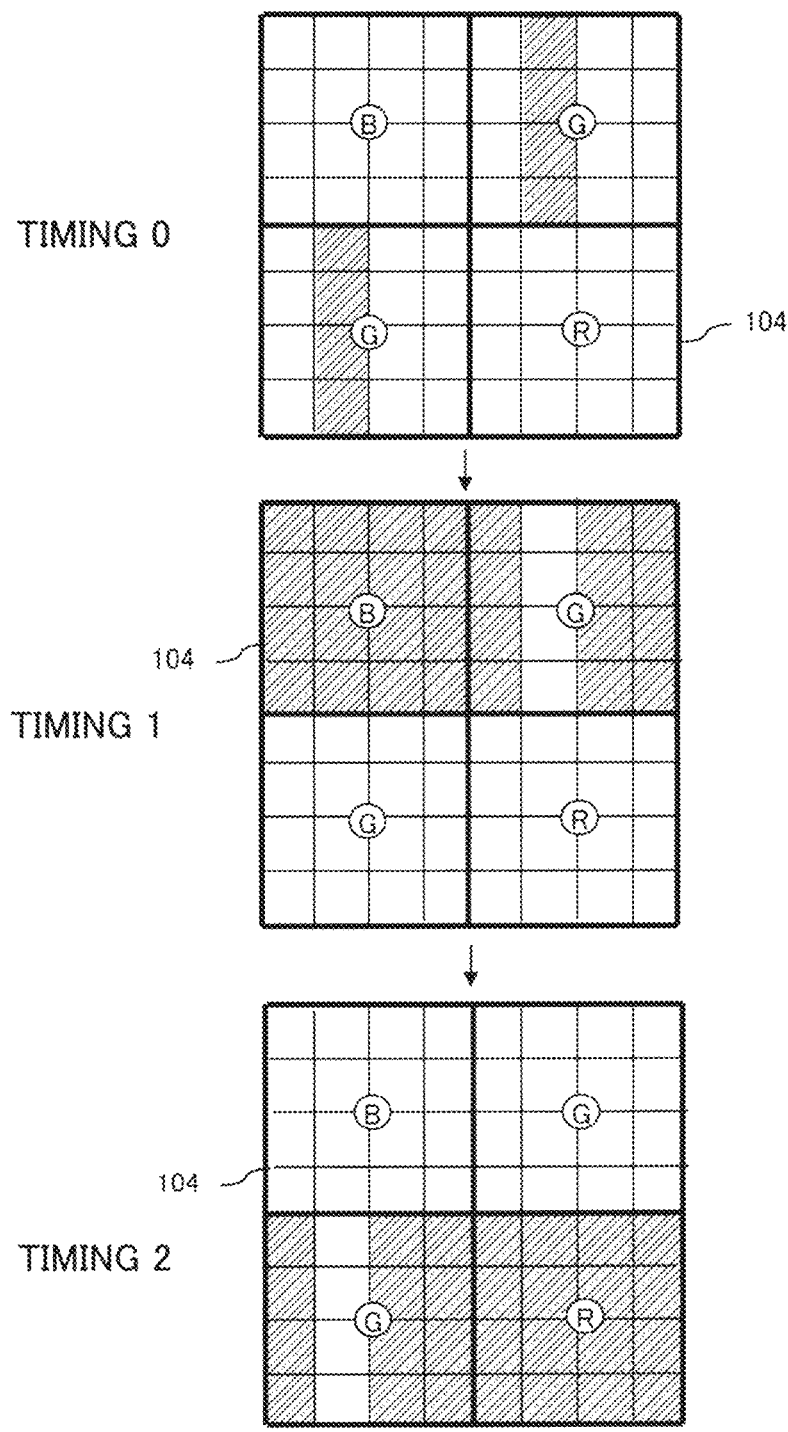
FIG. 18 is a diagram illustrating a readout operation oft modified example of the readout operation (at timing 0, four sub-pixels in the second row from the left of each of the G pixels are read) in the case of a configuration of 16C cells.

FIG. 18 is different tom FIG. 17 in the sub-pixel to be read of each of the G pixels serving as the phase detection pixels at timing 0. In this example, at timing 0, four sub-pixels in the second row from the left of each of the G pixels am read. At each of timings 1 and 2, in the first and second rows, the remaining image pixels are read for each row, and the remaining portions of the phase detection pixel are read.

Figure 19:
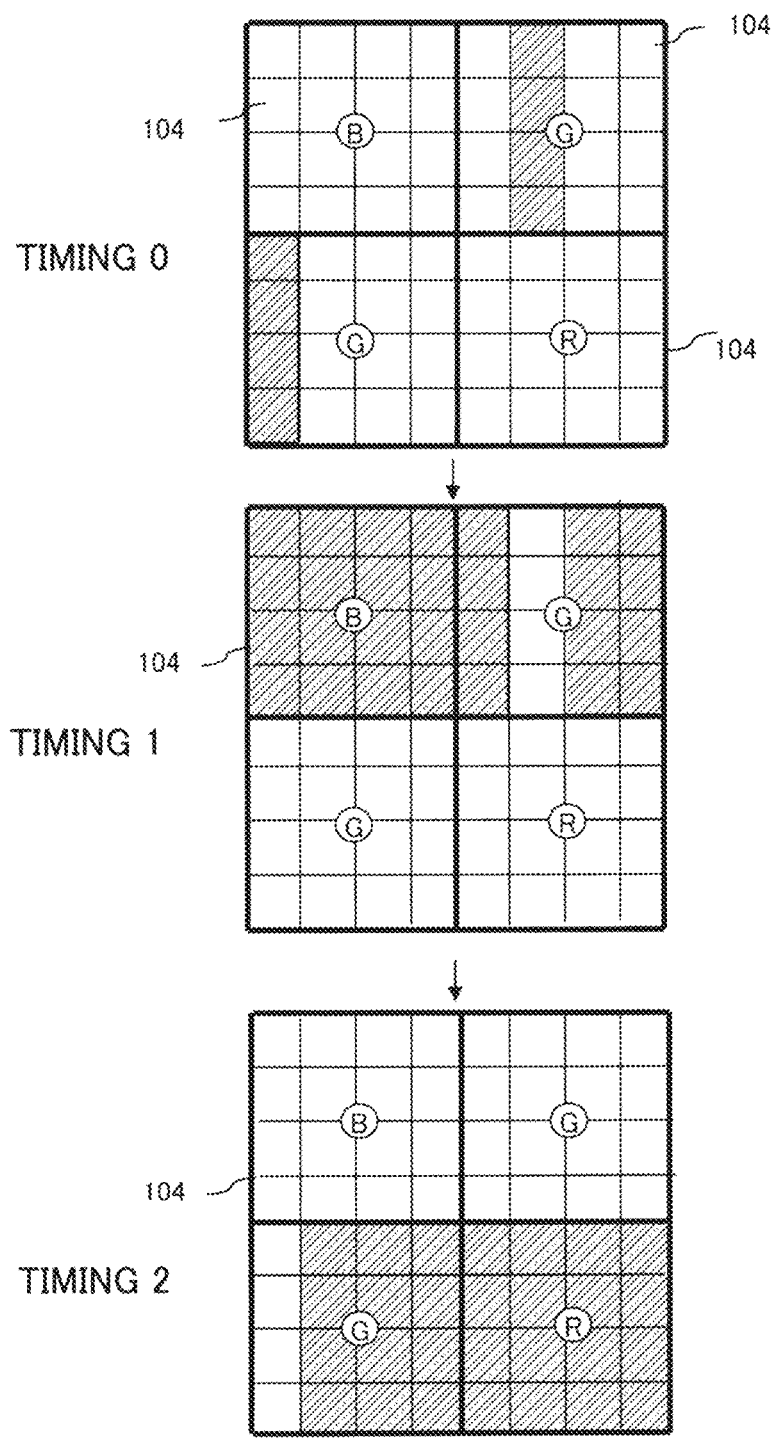
FIG. 19 is a diagram illustrating a readout operation of a modified example of the readout operation (at timing 0, four sub-pixels in the second column of the G pixel in the first row and four sub-pixels in the first column of the G pixel in the second row are read) in the case of a configuration of 16C cells.

In FIG. 19, at timing 0, four sub-pixels in the second column of the G pixel in the first row and four sub-pixels in the first column of the G pixel in the second row are read. Thus, a position of the sub-pixels of the G pixel to be reed is different between the first and second rows. At each of timings 1 and 2, in the first and second rows, the remaining image pixels are read for each row, and the remaining portions of the phase detection pixel are read.

In FIGS. 20A and 20B, the readout for the first and second rows is the same as the readout illustrated in FIG. 17, the readout for the third and fourth rows is the same as the readout illustrated in FIG. 18, and the pattern is repeated every four rows.

Figure 21A:
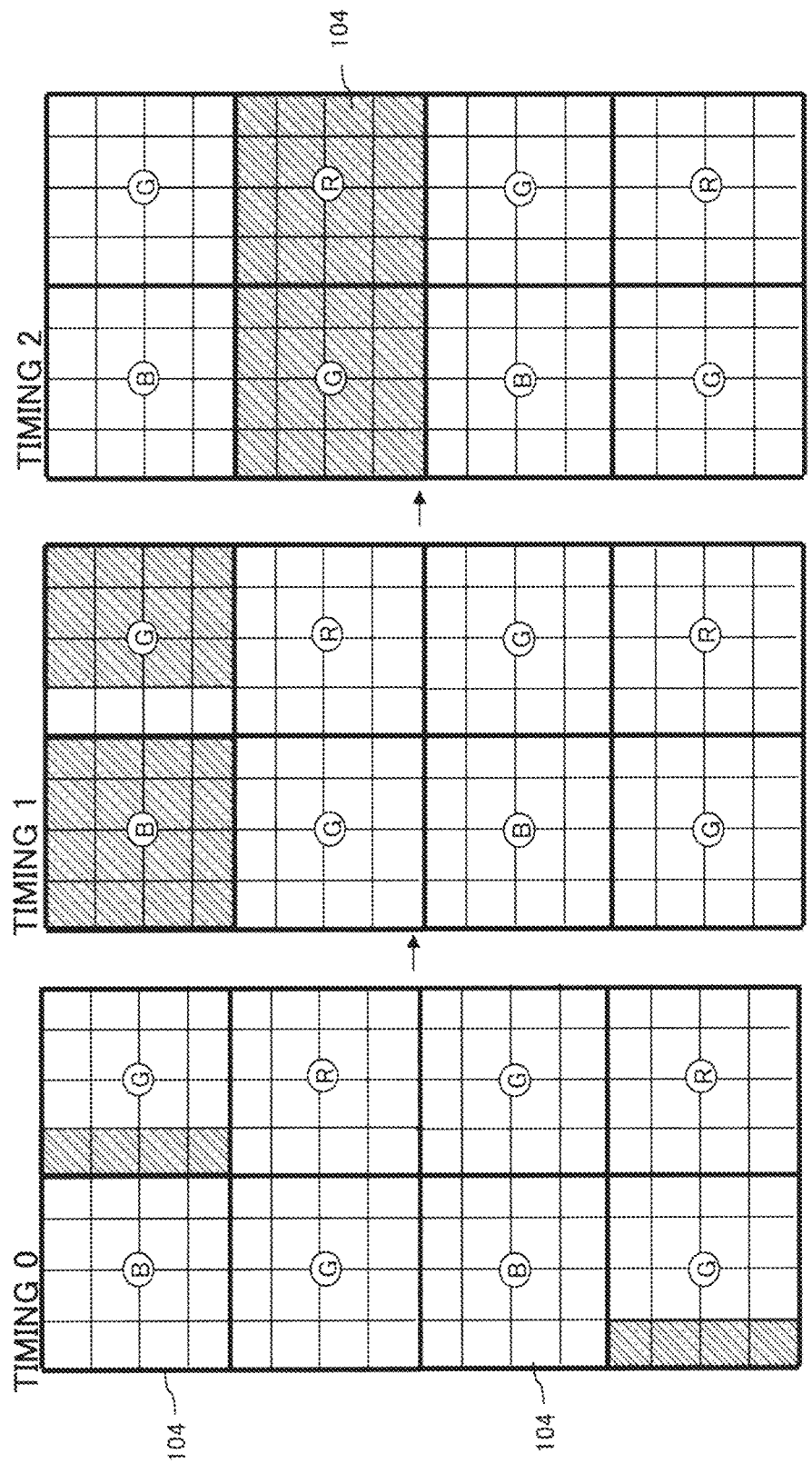
FIG. 21A is a diagram (first half) illustrating a readout operation of a modified example of the readout operation (in the readout at timing 0, four sub-pixels in the left-side one column of the G pixel in the first row, and four sub-pixels in the left-side one column of the G pixel in the fourth row are read) in the case of a configuration of 16C cells.
Figure 21B:
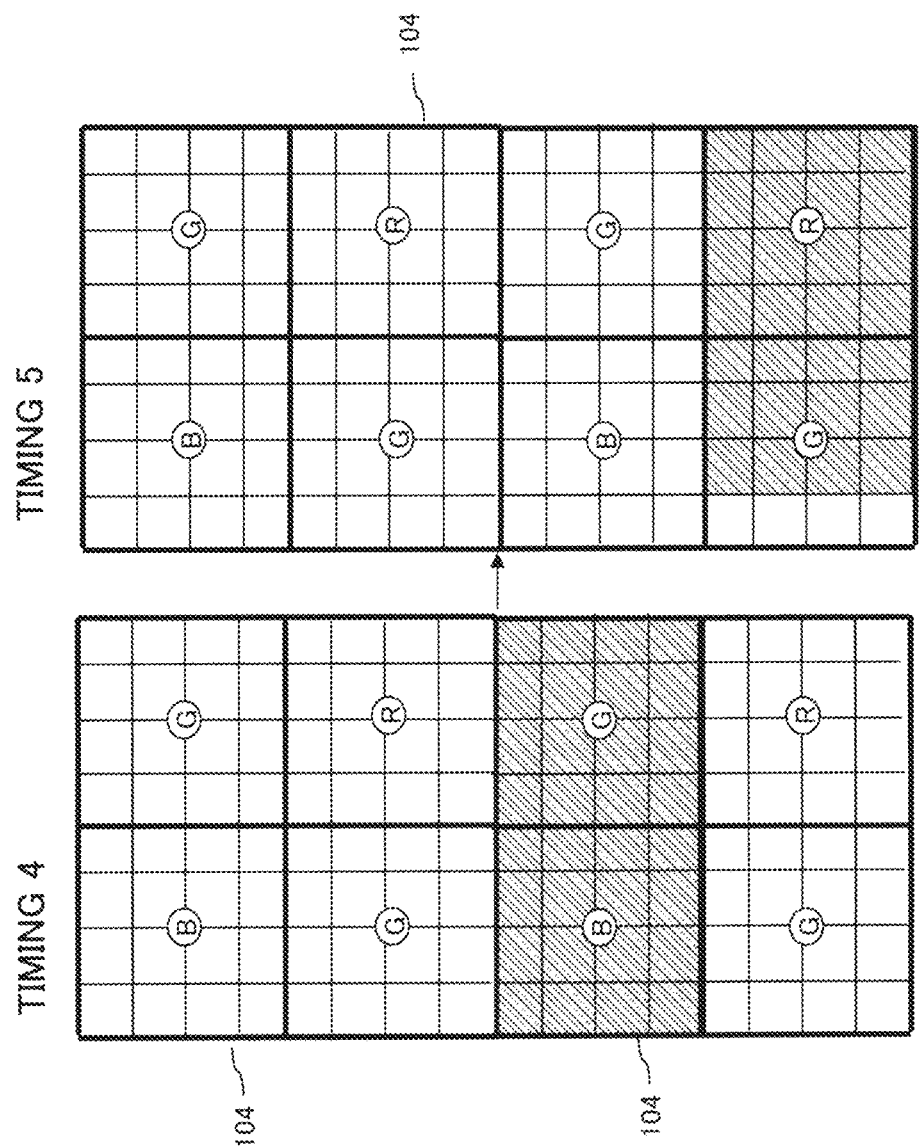
FIG. 21B is a diagram (second half) illustrating a readout operation of a modified example of the readout operation (in the readout at timing 0, four sub-pixels in the left-side one column of the G pixel in the first row, and four sub-pixels in the left-side one column of the G pixel in the fourth row are read) in the ease of a configuration of 16C cells.

In FIGS. 21A and 21B, in the readout at timing 0, four sub-pixels in the left side one column of the G pixel in the first row, and four sub-pixels in the left-side one column of the G pixel in the fourth row are read. At each of timings 1 and 4, in the first and fourth rows, the remaining image pixels are read for each row, and the remaining portions of the phase detection pixel are read.

Figure 22:
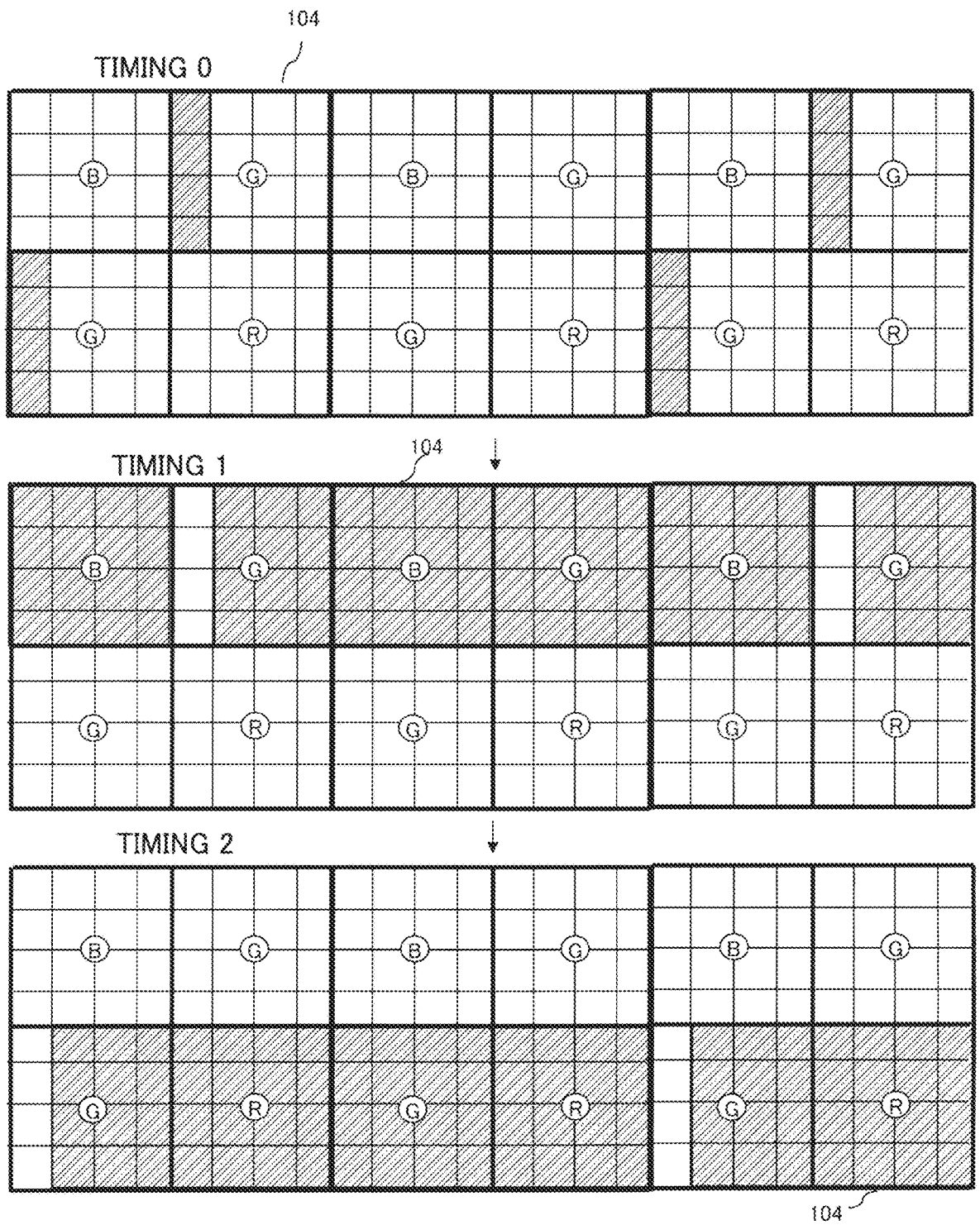
FIG. 22 is a diagram illustrating ng a modified example of the readout operation (the readout is performed with two rows and six columns as a unit) in the case of a configuration of 16C cells.

FIG. 22 illustrates one example in which the readout is performed with two rows and six columns as a unit. The first column and the third column are read in the same pattern as in illustrated in FIG. 17, and no phase detection pixels are provided in the second column.

Figure 23:
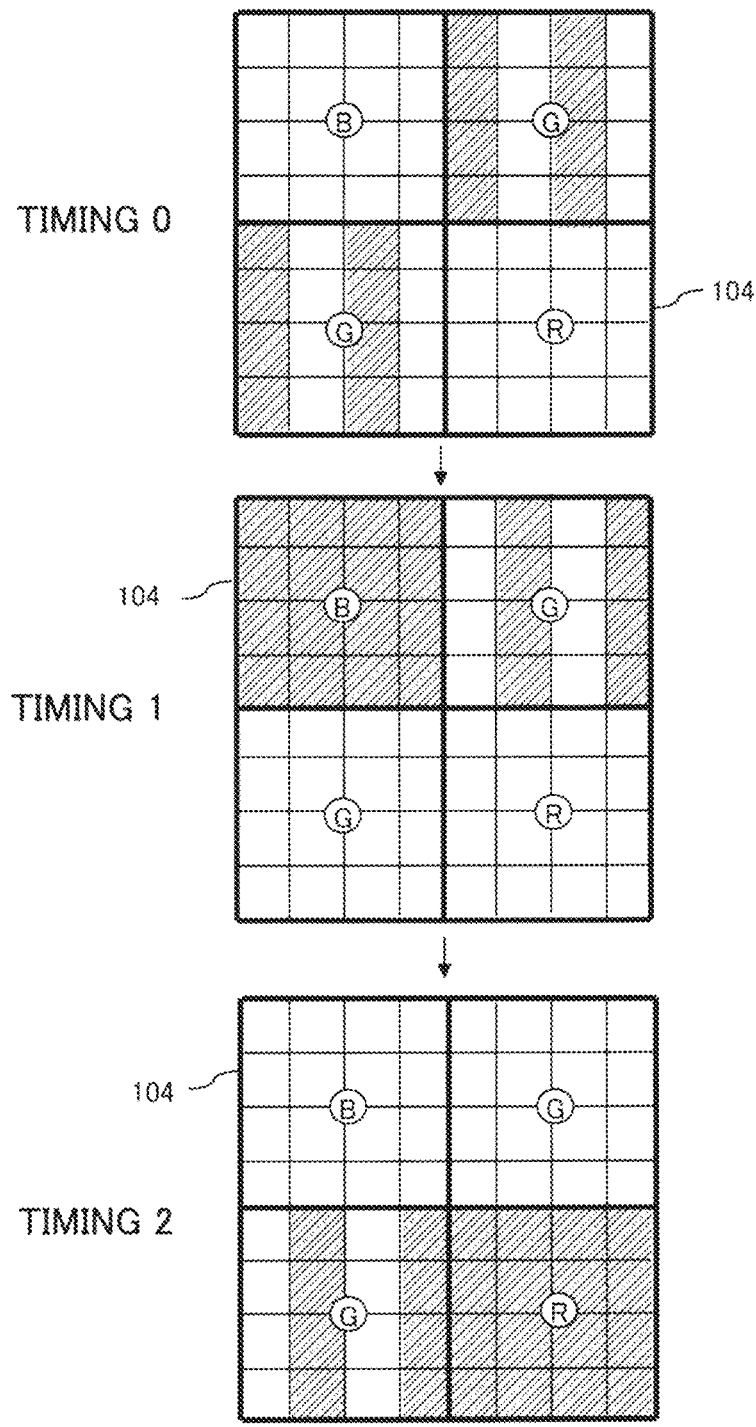
FIG. 23 is a diagram illustrating a readout operation of a modified example of the readout operation (the phase detection pixel is divided into two of sub-pixels in the first and third columns and sub-pixels in the second and fourth columns) in the case of a configuration of 16C cells.

In FIG. 23, the phase detection pixel is divided into sub-pixels in the first and third columns and sub-pixels in the second and fourth columns.

That is, at timing 0, the first and third columns of each of the G pixels in the first and second rows are read, and in each of timings 1 and 2, the remaining image pixels and the remaining portions of the phase detection pixel in the first and second rows are read. Note that in the floating diffusion FD, charges from the photodiodes are summed, whereby two columns in the transverse direction in one pixel can be read simultaneously.

Figure 24A:
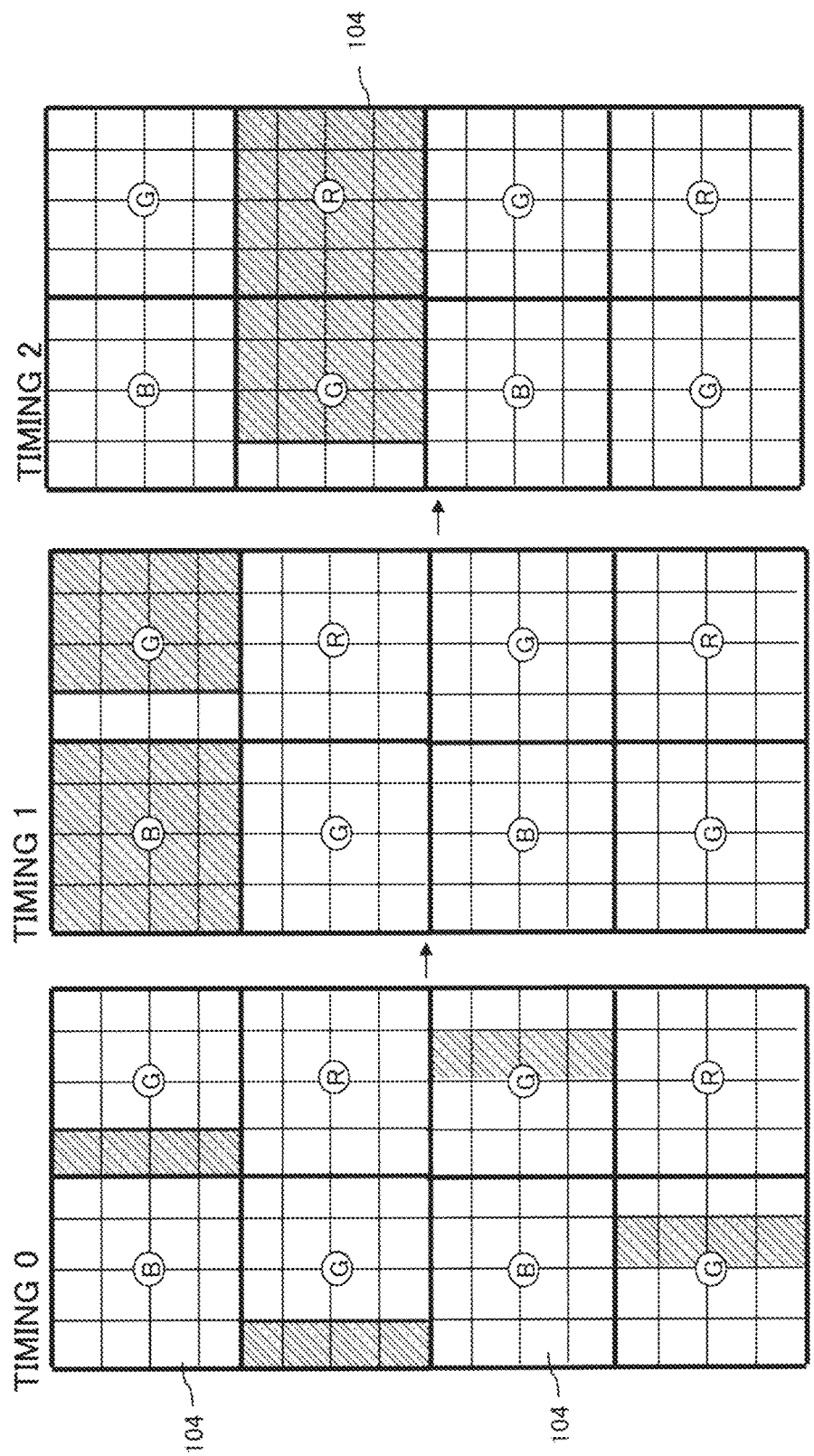
FIG. 24A is a diagram (first half) illustrating a readout operation of a modified example of the readout operation (at timing 0, the phase detection pixels in the four rows are read for each row, then, at each of timings 1 through 2, the pixels and the portions in the top two rows that have not been read are read) in the case of a configuration of 16C cells.
Figure 24B:
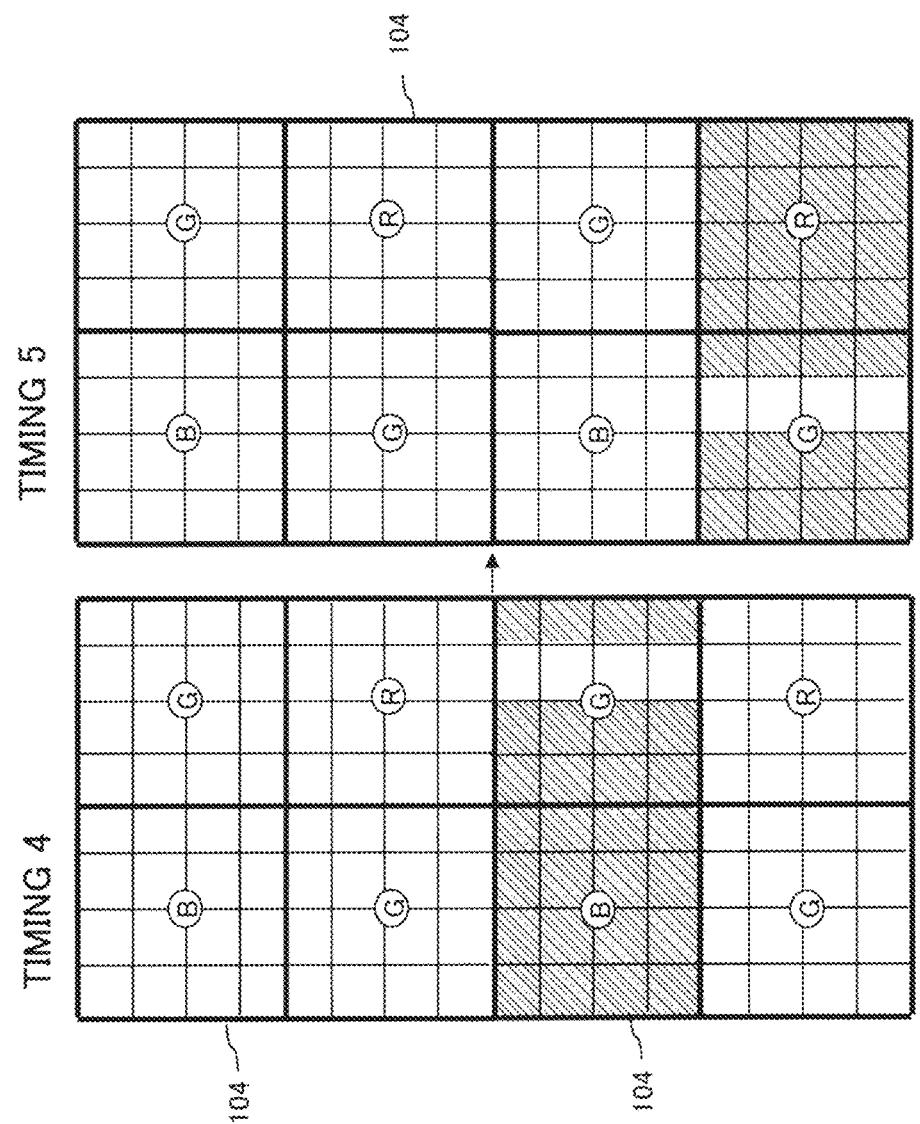
FIG. 24B is a diagram (second half) illustrating a readout operation of a modified example of the readout operation (at each of timings 4 through 5, the pixels and the portions in the bottom two rows that have not been read are read) in the case of a configuration of 16C cells.

In FIGS. 24A and 24B, at timing 0, the phase detection pixels in the four rows are read every one column. Then, at each of timings 1 and 4, the pixels and the portions in the four rows that have not been read are read.

Figure 25:
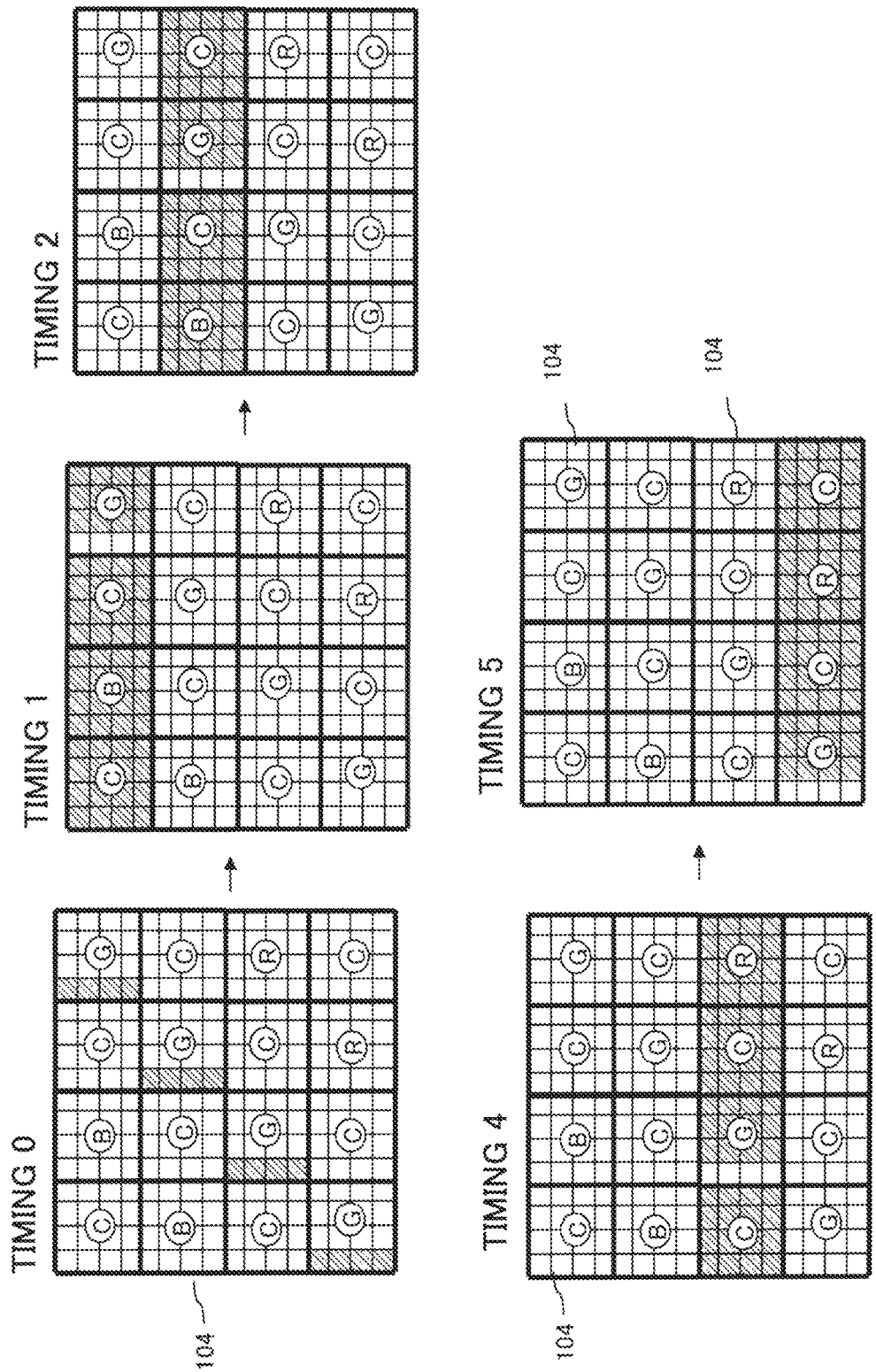
FIG. 25 is a diagram illustrating a readout operation of a modified example of the readout operation (an RGBC array is adopted in which a C pixel in which no filter is provided or a no-color clear filter is provided is included in addition to the RGB pixels) in the case of-a configuration of 16C cells.

In FIG. 25, an RGBC array is adopted in which a C pixel in which no filter is provided or a no-color clear filter is provided is included in addition to the RGB pixels. The readout is performed with four rows×four columns as a unit.

At timing 0, the first column of each of the G pixels in the four rows is read. Then, at each of timings 1 and 4, the remaining image pixels am read for each row, and the remaining portions of the phase detection pixel are read.

Figure 26:
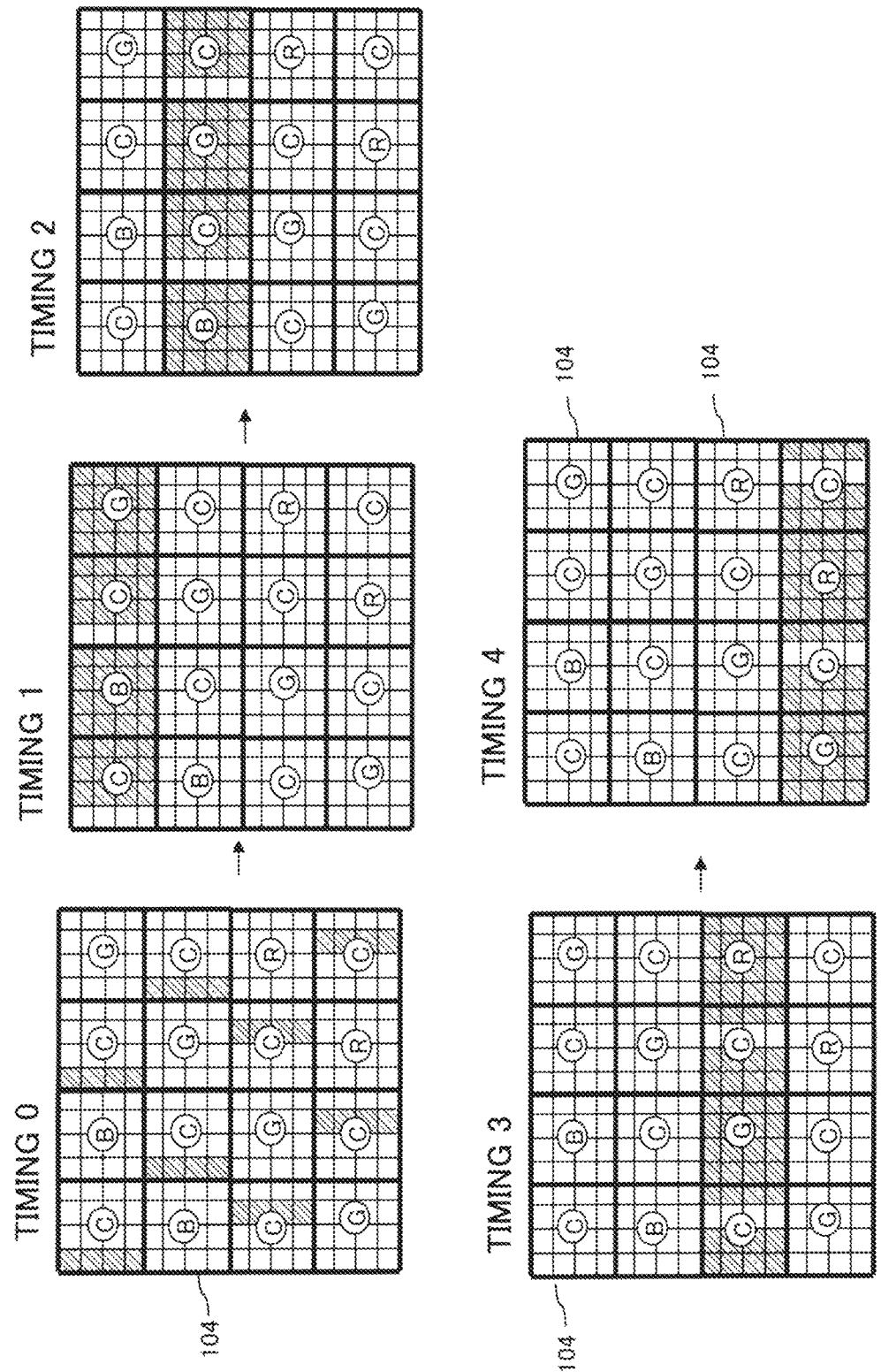
FIG. 26 is a diagram illustrating a readout operation of a modified example of the readout operation (in one example in which the RGBC array is adopted in the same manner as illustrated in FIG. 25, and the readout is performed with four rows×four columns as a unit, the C pixels instead of the G pixels serve as the phase detection pixels) in the case of a configuration of 16C cells.

In FIG. 26, the RGBC array is adopted in the same manner as illustrated in FIG. 25, and the readout is performed with four rows×four columns as a unit. In addition, the C pixels instead of the G pixels serve as the phase detection pixels. There are two C pixels in the one row, and at timing 0, the first column of each of the C pixels in the first and second rows and the third column of each of the C pixels in the third and fourth rows am read. Then, at each of timings 1 to 4, the remaining image pixels are mad for each row, and the remaining portions of the phase detection pixel are read.

"On Chip Micro-Lens"

A photodiode PD is provided for each pixel, and a signal is output according to a charge obtained by photoelectric conversion on the incident light performed by the photodiode PD. In the present embodiment, one photodiode PD is basically provided for each sub-pixel. One transfer transistor TX is provided for one photodiode PD, whereby a signal can be output for each of the sub-pixels. An image signal can be output for each of the pixels, and one pixel is divided, which ambles output of a phase detection signal according to partial incident light.

Figure 27A:
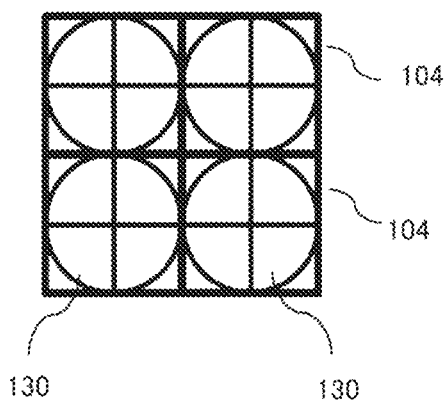
FIG. 27A is a diagram illustrating an arrangement of an on chip micro-lens corresponding to pixel configurations in FIGS. 4 to 7 and 9 to 13.
Figure 27B:
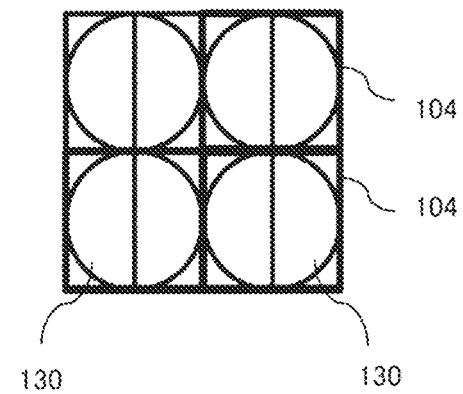
FIG. 27B is a diagram illustrating an arrangement of an on chip micro-lens corresponding to a pixel configuration in FIG. 8.
Figure 27C:
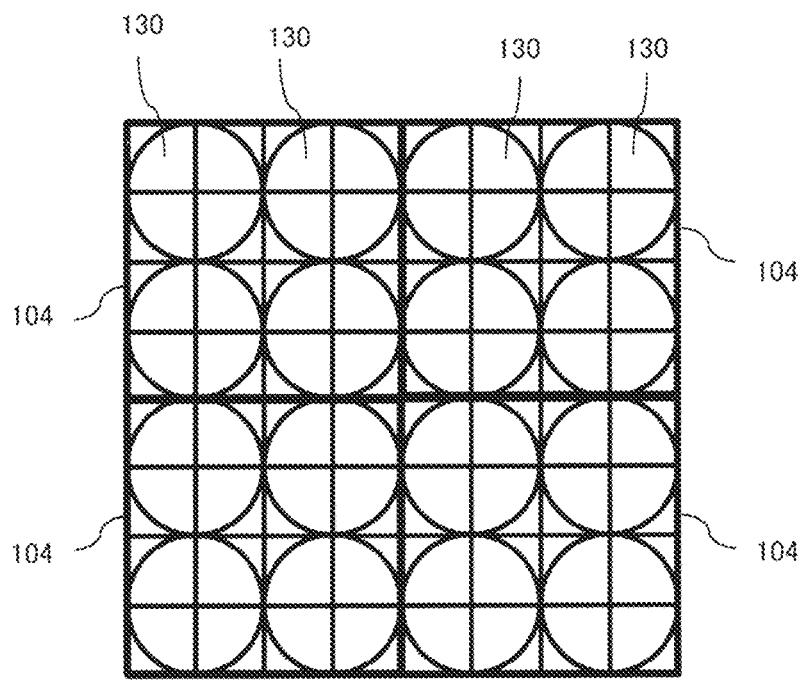
FIG. 27C is a diagram illustrating an arrangement of an on chip micro-lens corresponding to pixel configurations in FIGS. 17 to 26.

FIGS. 27A, 27B, and 27C each illustrate an arrangement of an on chip micro-lens with respect to each pixel.

FIG. 27A illustrates an arrangement of an on chip micro-lens 130 corresponding to pixel configurations in FIGS. 4 to 7 and 9 to 13. One pixel comprises four sub-pixels, but one on chip micro-lens 130 is provided for one pixel. Accordingly, detecting the incident light for each of the sub-pixels makes it possible to divide the light passing through one on chip micro-lens 130 into a plurality of light beams to detect the plurality of light beams, which enables phase detection. The auto focusing can be performed using the phase information.

FIG. 27B illustrates an arrangement of the on chip micro-leas 130 corresponding to the pixel configuration in FIG. 8, and FIG. 27C illustrates an arrangement of the on chip micro-lens 130 corresponding to the pixel configurations in FIGS. 17 to 26.

"Others"

In the above description, a Bayer pattern, and a pattern obtained by combining the Bayer pattern with a white pixel are used as a color pattern. However, the color pattern is not limited thereto, and various patterns can be adopted.

When the Bayer pattern is adopted, the number of G pixels is greater than each of the number of R pixels and the number of B pixels. Accordingly, the G pixels axe used as the phase detection pixels, whereby the phase detection pixels can be arranged uniformly over the entire screen. Even when the RGBC array is minimized, the C pixels are used as the phase detection pixels, whereby the accuracy of the phased detection can be improved.

In the above description, various examples have been described for an arrangement of the phase detection pixels, but the similar process can be performed even when these examples are combined, the number of pixels in the readout unit is further increased, or the number of phase detection pixels is decreased.

In the floating diffusion FD, charges from the plurality of photodiodes are summed, whereby two columns in the transverse direction in one pixel can be read simultaneously, the two columns being separated from each other in the four columns.

"Configuration of Modified Example"

Figure 28:
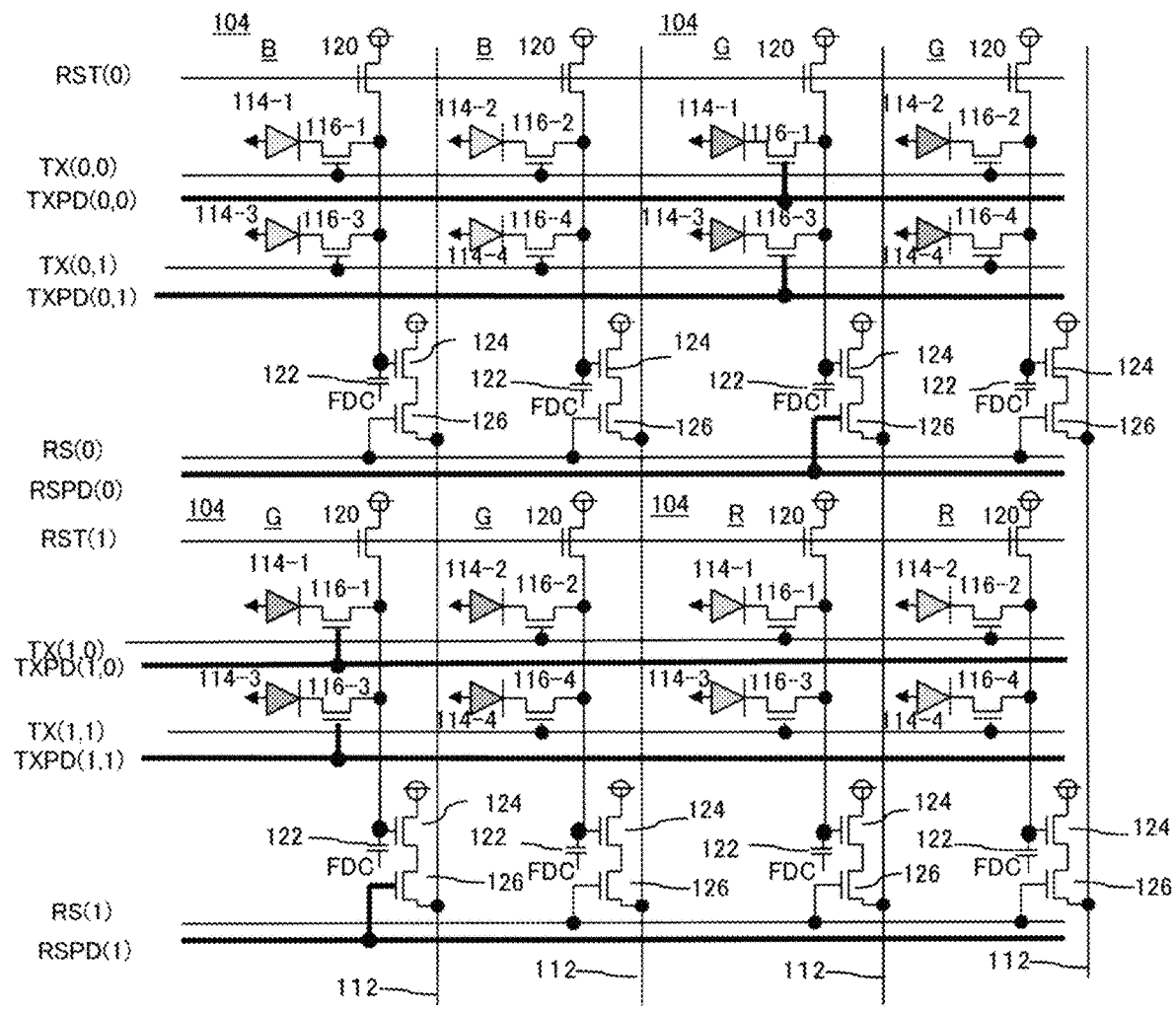
FIG. 28 is a diagram illustrating a circuit configuration of a pixel circuit comprising four pixels, the pixel circuit being the same as the pixel circuit illustrated in FIG. 3.

FIG. 28 illustrates a circuit configuration of a pixel circuit of a modified example comprising four pixels, a readout operation from each pixel being the same as the pixel circuit illustrated in FIG. 3.

In this circuit, one pixel includes four photodiodes 114 and comprises four sub-pixels in the same manner as in the circuit illustrated in FIG. 3. A pixel at the upper left is a B pixel, a pixel at the upper right is a G pixel, a pixel at the lower left is a G pixel, and a pixel at the lower right is an R pixel. The two G pixels serve as phase detection pixels, and each includes a plurality of phase detection autofocus photodiodes so that signals from the two photodiodes 114-1 and 114-3 in the left half and the two photodiodes 114-2 and 114-4 in the right half can be separately detected.

A reset line RST(0) for the first-row pixels is connected with gates of reset transistors 120 in the first row.

In one pixel, the fair transfer transistors 116-1 to 116-4 are arranged.

A transfer control signal line TX(0,0) for the first-row pixels is connected with gates of the transfer transistors DC 116-1 to 116-2 of the B pixel at the upper left and gate of the transfer transistor TX 116-2 in the right half of the G pixel at the upper right. A transfer control signal line TX(0,1) is connected with gates of the transfer transistors TX 116-3 to 116-4 of the B pixel at the upper left and gate of the transfer transistor DC 116-4 in the right half of the G pixel at the upper right.

A transfer control signal line TXPD(0,0) in the first row is connected with gate of the transfer transistors TX 116-1 in the left half of the G pixel at the upper right. A transfer control signal line TXPD(0,1) is connected with gate of the transfer transistor TX 116-3 in the left half of the G pixel at the upper right.

A readout selection signal line RS(0) is connected with gates of row select transistors 126 of the B pixel at the upper left and a gate of a row select transistor 126 in the right half of the G pixel at the upper right, and a readout selection signal line RSPD(0) is connected with a gate of a row select transistor 126 in the left half of the upper-right pixel.

The same signals are supplied also to the other pixels in the fast row and the pixels in the second row and the subsequent rows.

In the second row in FIG. 28, a reset line RST(1) is connected with gates of react transistors 120 in the second row.

A transfer control signal line TX(1,0) is connected with gate of the transfer transistor TX 116-2 in the right half of the G pixel at the lower left and gates of the transfer transistors TX 116-1 to 116-2 of the R pixel at the lower right. A transfer control signal line TX(1,1) is connected with gate of the transfer transistor TX 116-4 in the right half of the G pixel at the lower left and gates of the transfer transistors TX 116-3 to 116-4 of the R pixel at the lower right.

A transfer cannot signal line TXPD(1,0) is connected with gate of the transfer transistor TX 116-1 in the left half of the G pixel at the lower left. A transfer control signal line TXPD(1,1) is connected with gate of the transfer transistor TX 116-3 in the left half of the G pixel at the lower led.

A readout selection signal line RS(1) is connected with a gate of a row select transistor 126 in the right half of the G pixel at the lower left and gates of now select transistors 126 of the R pixel at the lower right, and a readout selection signal line RSPD(1) is connected with a gate of a row select transistor 126 in the lea half of the lower-left pixel.

In this example, in one pixel, the two transfer transistors 116-1 and 116-3 in the left half are connected with one bit line 112 via a corresponding source follower transistor 124 and the corresponding row select transistor 126, and the two transfer transistors 116-2 and 116-4 in the right half are connected with the other bit line 112 via a corresponding source follower transistor 124 and the corresponding row select transistor 126. Accordingly, one pixel is connected with the two bit lines 112.

The readout selection signal line RS(0) is connected with the two row select transistors 126 of the B pixel at the upper left and the row select translator 126 in the right half of the a pixel at the upper right, and the readout selection signal line RSPD(0) is connected with the row select transistor 126 in the left half of the upper-right pixel.

Accordingly, in the G pixel, the signals from the two sub-pixels in the left half and the signals from the two sub-pixels in the right half can be read out from the different bit lines 112.

Each bit line 112 is connected with a readout circuitry 106, and after being A/D converted in the readout circuitry 106, the signals me subjected to data processing. Note that when the signals from the two bit lines 112 are summed, analog signals on the bit lines 112 may be summed or digital data after the A/D conversion may summed.

Figure 29:
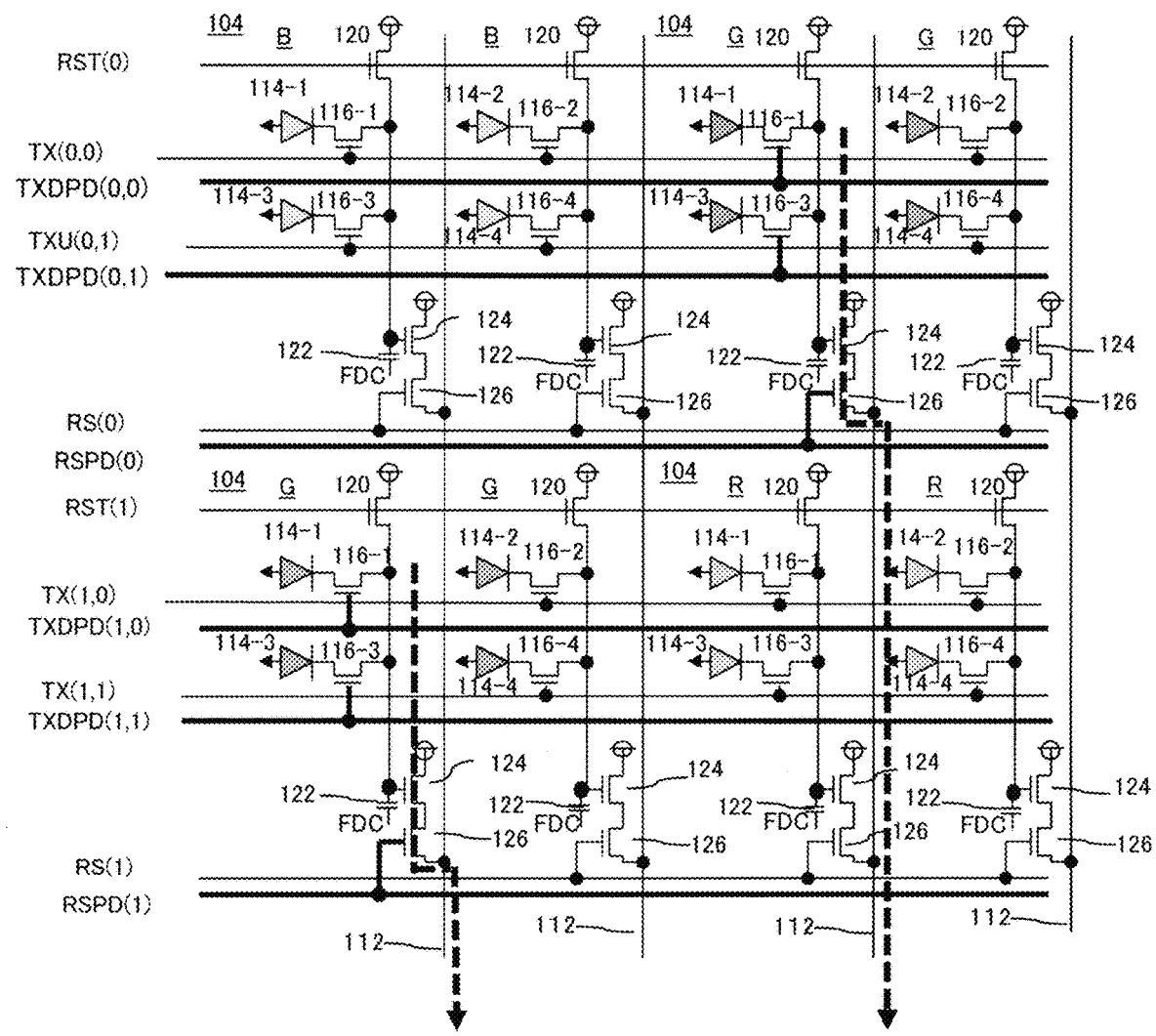
FIG. 29 is a diagram illustrating a readout state at timing 0 of the pixel circuit in FIG. 28.

FIG. 29 illustrates a readout state at timing 0. At timing 0, the transfix control lines TXPD(0,0), TXPD(0,1), TXPD(1, 0) and TXPD(1,1) and the readout selection signal lines RSPD(0) and RSPD(1) are on, and therefore, the signals are output from the left half of the G pixel in each of the first row and the second row.

Figure 30:
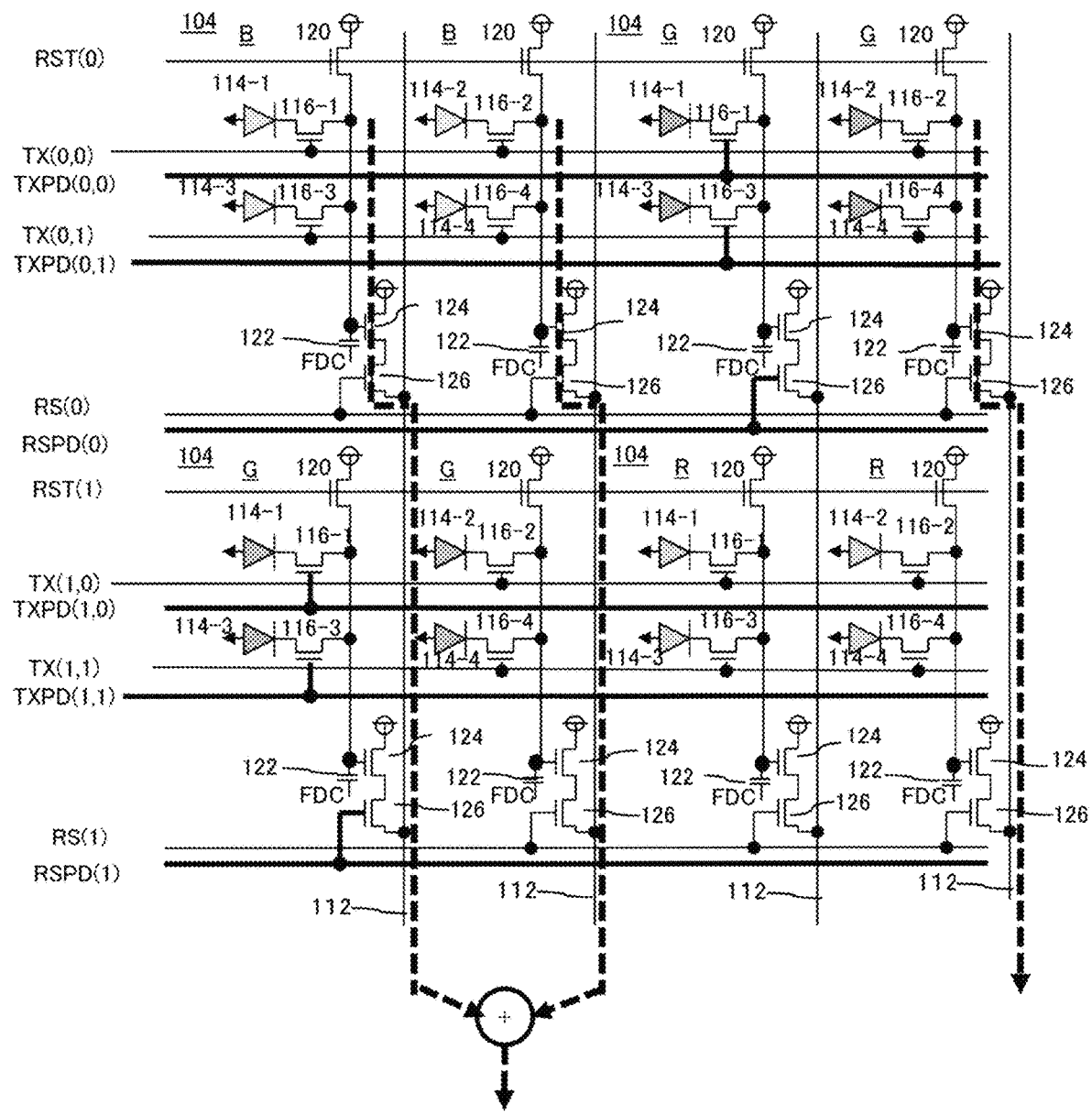
FIG. 30 is a diagram illustrating a readout state at timing 1 of the pixel circuit in FIG. 28.

FIG. 30 illustrates a readout state at timing 1. At timing 1, the transfer control lines TX(0,0) and TX(0,1) and the readout selection signal line RS(0) are on, and therefore, the signals are output from the B pixel and the right half of the G pixel in the first row.

Note that in this example, the outputs from the two bit lines 112 and 112 of the B pixel are summed to serve as the signal of one pixel.

Figure 31:
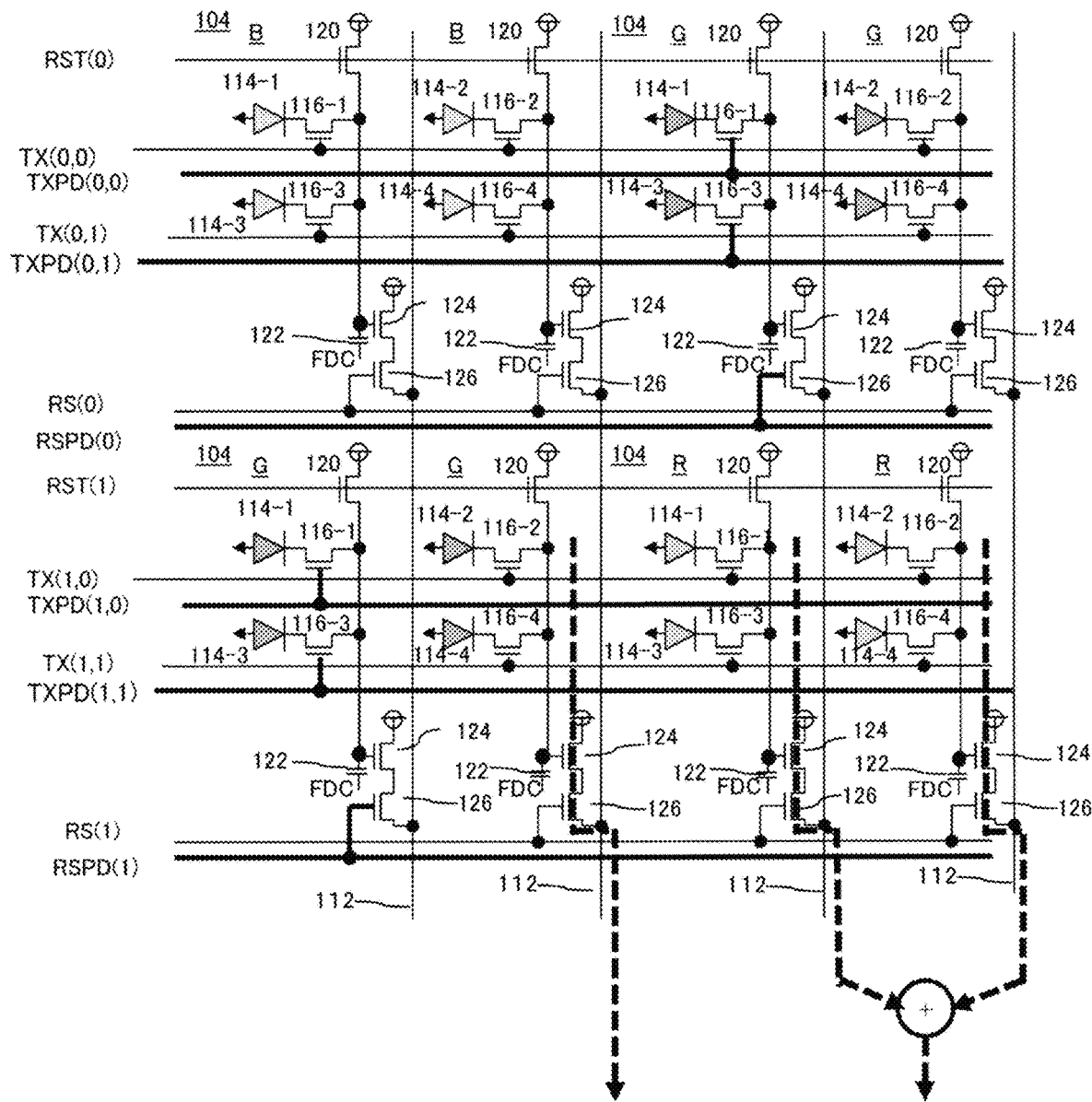
FIG. 31 is a diagram illustrating a readout state at timing 2 of the pixel circuit in FIG. 28.

FIG. 31 illustrates a readout state at timing 2. At timing 2, the transfer control lines TX(1,0) and TX(1,1) and the readout selection signal line RS(1) are on, and therefore, the signals are output from the right half of the G pixel and the R pixel in the second row.

Note that in this example, the outputs from the two bit lines 112 and 112 of the R pixel are summed to serve as the signal of one pixel.

Figure 32A:
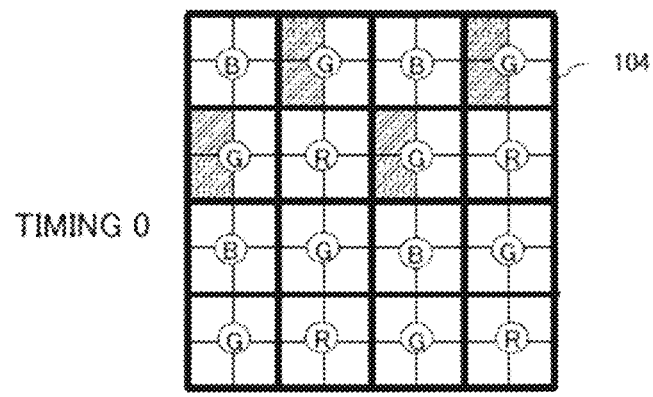
FIG. 32A is a diagram illustrating the readout state at timing 0 when as for G pixels, the respective right halves are first read in the first row and the respective left halves are first read in the second row.
Figure 32B:
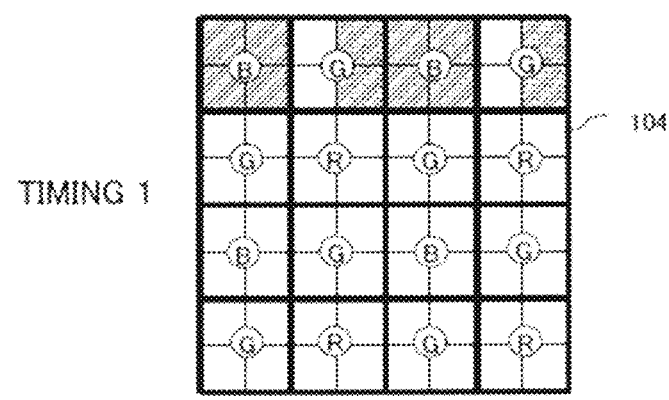
FIG. 32B is a diagram illustrating the readout state at timing 1 when as for G pixels, the respective right halves are first read in the first row and the respective left halves are first read in the second row.
Figure 32C:
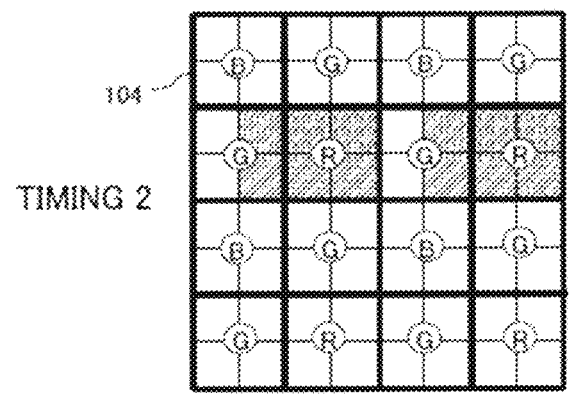
FIG. 32C is a diagram illustrating the readout state at timing 2 when as for G pixels, the respective right halves are first read in the first row and the respective left halves are first read in the second row.

FIGS. 32A, 32B, and 32C are diagrams illustrating the readout states at timings 0, 1, and 2, respectively.

The invention claimed is:

1. An image sensor, comprising:
   a plurality of pixels that are arranged in a matrix and each of which outputs a signal in response to incident light, wherein readout of data can be performed with respect to the plurality of pixels, and simultaneous readout of data of a plurality of columns of pixels can be performed, and at least one pixel of the plurality of columns of pixels to be read simultaneously can be read for phase detection with respect to each of divided sub-pixels; and
   a processor configured to control readout of the signal from each pixel,
   wherein the processor is configured to,
   with n rows as a readout unit, where n is an integer of 2 or more,
   perform readout for at least one sub-pixel of at least one pixel in one readout cycle within the readout unit,
   perform readout for each pixel including readout for the other sub-pixel of the at least one pixel in which the at least one sub-pixel has been read in the one readout cycle, in another readout cycle within the readout unit, and
   end the readout for the readout unit with the n+1 readout cycles.

2. The image sensor according to claim 1, wherein
   each pixel comprises sub-pixels arranged in 2×2,
   a readout unit comprises pixels arranged in n rows×n columns,
   in one readout cycle within the readout unit, as for two pixels, two sub-pixels of one of the two pixels are read for phase detection, and
   in the other n readout cycles within the readout unit, the other two sub-pixels of the two pixels in which the two sub-pixels of the one have been read in the one readout cycle are read for phase detection, and each of the remaining pixels is read.

3. The image sensor according to claim 2, wherein
   a readout unit comprises one red pixel, two green pixels, and one blue pixel, and
   the two green pixels are read for phase detection in a unit of two sub-pixels, and the one red pixel and the one blue pixel are read in a pixel unit.

4. The image sensor according to claim 3, wherein
   the two green pixels include two sub-pixels connected to dedicated readout control lines, and the other two sub-pixels connected to readout control lines of the red pixel or the blue pixel.

5. The image sensor according to claim 1, wherein
   each pixel comprises sub-pixels arranged in 4×4, a readout unit comprises pixels arranged in n rows×n columns, in one readout cycle within the readout unit, as for two pixels, four sub-pixels of one of the two pixels are read, and in the other n readout cycles within the readout unit, the other two sub-pixels of the two pixels in which the two sub-pixels of the one have been read for phase detection in the one readout cycle are read for phase detection, and each of the remaining pixels is read.

6. The image sensor according to claim 5, wherein a readout unit comprises one red pixel, two green pixels, and one blue pixel, the two green pixels are read for phase detection in a unit of two divisions, and the one red pixel and the one blue pixel are read in a pixel unit.

7. The image sensor according to claim 6, wherein the two green pixels include two sub-pixels, among divisions resulting from each green pixel divided into two, connected to dedicated readout control lines, and the other two sub-pixels connected to readout control lines of the red pixel or the blue pixel.

8. A method for reading out a signal of an image sensor, the image sensor comprising a plurality of pixels that are arranged in a matrix and each of which outputs a signal in response to incident light, wherein readout of data can be performed with respect to the plurality of pixels, and simultaneous readout of data of a plurality of columns of pixels can be performed, and at least one pixel of the plurality of columns of pixels to be read simultaneously can be read for phase detection with respect to each of divided sub-pixels, the method comprising:

with n rows as a readout unit, where n is an integer of 2 or more, performing readout for at least one sub-pixel of at least one pixel in one readout cycle within the readout unit;

performing readout for each pixel including phase detection readout for the other sub-pixel of the at least one pixel in which the at least one sub-pixel has been read in the one readout cycle, in another readout cycle within the readout unit; and ending the readout for the readout unit with the n+1 readout cycles.

9. An image sensor, comprising:

a plurality of pixels that is arranged in a matrix and each of which outputs a signal in response to incident light, the plurality of pixels including image pixels configured to output a signal for each pixel, and phase detection pixels each in which the pixel is divided to output a signal, and each pixel of the plurality of pixels including a plurality of photodiodes and a plurality of transfer transistors configured to control outputs of signals of the plurality of photodiodes, respectively;

a first transfer control signal line extending in a row direction and configured to transfer a signal controlling on and off of the transfer transistor on one side of each image pixel;

a second transfer control signal line extending in the row direction and configured to transfer a signal controlling on and off of the transfer transistor on the other side of each image pixel; and a third transfer control signal line configured to transfer a signal controlling on and off of one transfer transistor of each phase detection pixel; and wherein another transfer transistor of each phase detection pixel is controlled by any ono of the first transfer transistor and the second transfer transistor.

10. The image sensor according to claim 9, further comprising:

a processor configured to control the first, second, and third transfer signal lines, wherein the processor turns on the first to third transfer control signal lines in order in a first readout cycle to turn on the corresponding transfer transistor.

11. An image sensor, comprising:

a plurality of pixels that are arranged in a matrix and each of which outputs a signal in response to incident light, the plurality of pixels including image pixels configured to output a signal for each pixel, and phase detection pixels each in which the pixel is divided to output a signal, and each pixel of the plurality of pixels including a plurality of photodiodes and a plurality of transfer transistors configured to control outputs of signals of the plurality of photodiodes, respectively;

a transfer control signal line extending in a row direction and configured to transfer a signal controlling on and off of the transfer transistor of each image pixel; and a phase detection transfer control signal line configured to transfer a signal controlling on and off of the transfer transistor on one side of each phase detection pixel, wherein another transfer transistor of each phase detection pixel is controlled by the transfer control signal line.

12. The image sensor according to claim 11, further comprising:

a processor configured to control the transfer signal line and the phase detection transfer control signal line, wherein the processor turns on the transfer control signal line and the phase detection transfer control signal line in order in one readout cycle to turn on the corresponding transfer transistor.

* * * * *